(12) United States Patent
Zerbarini

(10) Patent No.: US 9,491,905 B2
(45) Date of Patent: Nov. 15, 2016

(54) CROSS FLOW HORIZONTAL ROTARY LAWN MOWER WITH AIRFOIL BLADES

(71) Applicant: HRM Enterprises, Inc., Westerly, RI (US)

(72) Inventor: Richard Zerbarini, Westerly, RI (US)

(73) Assignee: HRM Enterprises, Inc., Westerly, RI (US)

( * ) Notice: Subject to any disclaimer, the term of this patent is extended or adjusted under 35 U.S.C. 154(b) by 0 days.

(21) Appl. No.: 14/524,860

(22) Filed: Oct. 27, 2014

(65) Prior Publication Data

US 2015/0107210 A1    Apr. 23, 2015

Related U.S. Application Data

(63) Continuation of application No. 13/768,856, filed on Feb. 15, 2013, and a continuation of application No. PCT/US2014/016319, filed on Feb. 13, 2014.

(60) Provisional application No. 61/895,859, filed on Oct. 25, 2013.

(51) Int. Cl.
| | |
|---|---|
| *A01D 34/53* | (2006.01) |
| *A01D 34/62* | (2006.01) |
| *A01D 34/52* | (2006.01) |
| *A01D 34/43* | (2006.01) |
| *A01D 34/47* | (2006.01) |
| *A01D 34/49* | (2006.01) |
| *A01D 43/00* | (2006.01) |

(52) U.S. Cl.
CPC ............. *A01D 34/62* (2013.01); *A01D 34/43* (2013.01); *A01D 34/47* (2013.01); *A01D 34/49* (2013.01); *A01D 34/52* (2013.01); *A01D 43/00* (2013.01)

(58) Field of Classification Search
CPC ...... A01D 34/52; A01D 34/43; A01D 43/00; A01D 34/49; A01D 34/62; A01D 34/53
USPC ................................. 56/249, 13.3; 172/28
See application file for complete search history.

(56) References Cited

U.S. PATENT DOCUMENTS

| | | | | |
|---|---|---|---|---|
| 1,669,471 | A * | 5/1928 | Jones | ............................. 56/16.6 |
| 2,656,662 | A * | 10/1953 | Hines | .................. A01D 34/435 172/45 |
| 2,947,129 | A * | 8/1960 | Kowalik | ................. A01F 29/12 56/1 |
| 2,999,346 | A * | 9/1961 | Mathews | ............... A01D 43/06 56/1 |
| 3,191,371 | A * | 6/1965 | Brewer | .................. A01D 34/63 56/295 |

(Continued)

*Primary Examiner* — Arpád Fábián-Kovács
(74) *Attorney, Agent, or Firm* — Suiter Swantz pc llo

(57) ABSTRACT

A lawnmower uses thin, replaceable blades with a hardened cutting edge and a cross-section defining an airfoil. Such blades are held by blade holding elements in a horizontally rotating mower blade assembly. The blade assembly and blade assembly housing are configured in a specialized cross-flow mower assembly to reduce grass leave tip damage, increase cut quality and overall aesthetic appeal, and create a cross-flow air current while consuming less power and providing a reduced environmental impact.

12 Claims, 19 Drawing Sheets

(56) References Cited

U.S. PATENT DOCUMENTS

| | | | | |
|---|---|---|---|---|
| 3,210,918 A * | 10/1965 | Van Der Lely | ............... | 56/294 |
| 3,641,754 A * | 2/1972 | Anstee | ............... | A01D 90/00 |
| | | | | 56/12.7 |
| 3,659,385 A | 5/1972 | Ferguson | | |
| 3,673,773 A * | 7/1972 | Ferguson | ............... | 56/13.3 |
| 3,729,143 A * | 4/1973 | Wagstaff | ............... | A01D 34/52 |
| | | | | 241/221 |
| 3,783,592 A * | 1/1974 | Schraut | ............... | 56/13.3 |
| 3,811,255 A | 5/1974 | Ferguson | | |
| 3,866,396 A * | 2/1975 | Meyer | ............... | A01D 44/00 |
| | | | | 56/9 |
| 3,896,609 A * | 7/1975 | Overesch | ............... | A01D 43/10 |
| | | | | 56/1 |
| 3,935,695 A * | 2/1976 | Merry | ............... | 56/13.4 |
| 3,998,034 A * | 12/1976 | Rubin | ............... | A01G 1/12 |
| | | | | 192/224.1 |
| 4,109,447 A | 8/1978 | Ferguson | | |
| 4,127,980 A | 12/1978 | Ferguson | | |
| 4,158,945 A * | 6/1979 | Burke | ............... | A01G 23/093 |
| | | | | 56/295 |
| 4,320,617 A * | 3/1982 | Fedeli | ............... | A01D 34/73 |
| | | | | 56/13.4 |
| 4,823,542 A * | 4/1989 | Klever | ............... | A01D 34/001 |
| | | | | 56/12.7 |
| 4,905,460 A * | 3/1990 | Toman | ............... | A01B 45/026 |
| | | | | 56/12.7 |
| 5,063,731 A * | 11/1991 | Hull | ............... | A01D 34/73 |
| | | | | 144/218 |
| 5,375,399 A * | 12/1994 | Kraft | ............... | A01D 34/005 |
| | | | | 15/347 |
| 5,467,586 A | 11/1995 | Lin et al. | | |
| 5,477,666 A * | 12/1995 | Cotton | ............... | A01D 34/62 |
| | | | | 56/251 |
| 5,485,718 A * | 1/1996 | Dallman | ............... | A01D 34/535 |
| | | | | 144/208.7 |
| 5,577,375 A * | 11/1996 | Tillison, Sr. | ............... | 56/17.5 |
| 5,806,293 A * | 9/1998 | Klein | ............... | A01D 34/49 |
| | | | | 172/22 |
| 6,026,635 A * | 2/2000 | Staiger | ............... | A01D 34/685 |
| | | | | 56/295 |
| 6,085,508 A * | 7/2000 | Miatt | ............... | A01D 34/74 |
| | | | | 56/15.5 |
| 6,182,430 B1 | 2/2001 | Blarek et al. | | |
| 6,321,518 B1 * | 11/2001 | O'Hagan | ............... | A01D 34/535 |
| | | | | 144/34.1 |
| 6,370,855 B1 * | 4/2002 | Evans | ............... | A01D 43/077 |
| | | | | 56/13.3 |
| 7,070,005 B2 * | 7/2006 | Maas | ............... | A01B 45/026 |
| | | | | 172/22 |
| 7,096,968 B2 * | 8/2006 | Maas | ............... | A01B 45/026 |
| | | | | 172/1 |
| 7,669,666 B2 * | 3/2010 | Maas | ............... | A01B 45/02 |
| | | | | 172/21 |
| 7,677,021 B2 | 3/2010 | Mahan et al. | | |
| 8,316,550 B2 | 11/2012 | Howells | | |
| 2002/0156556 A1 * | 10/2002 | Ruffner | ............... | A01B 69/008 |
| | | | | 701/23 |
| 2003/0061793 A1 * | 4/2003 | Wetzel | ............... | 56/12.7 |
| 2007/0277404 A1 * | 12/2007 | Lun | ............... | A01D 42/08 |
| | | | | 37/243 |
| 2013/0074376 A1 * | 3/2013 | Hishida | ............... | E01H 5/098 |
| | | | | 37/252 |
| 2014/0182256 A1 * | 7/2014 | Fischier | ............... | A01D 34/52 |
| | | | | 56/256 |

* cited by examiner

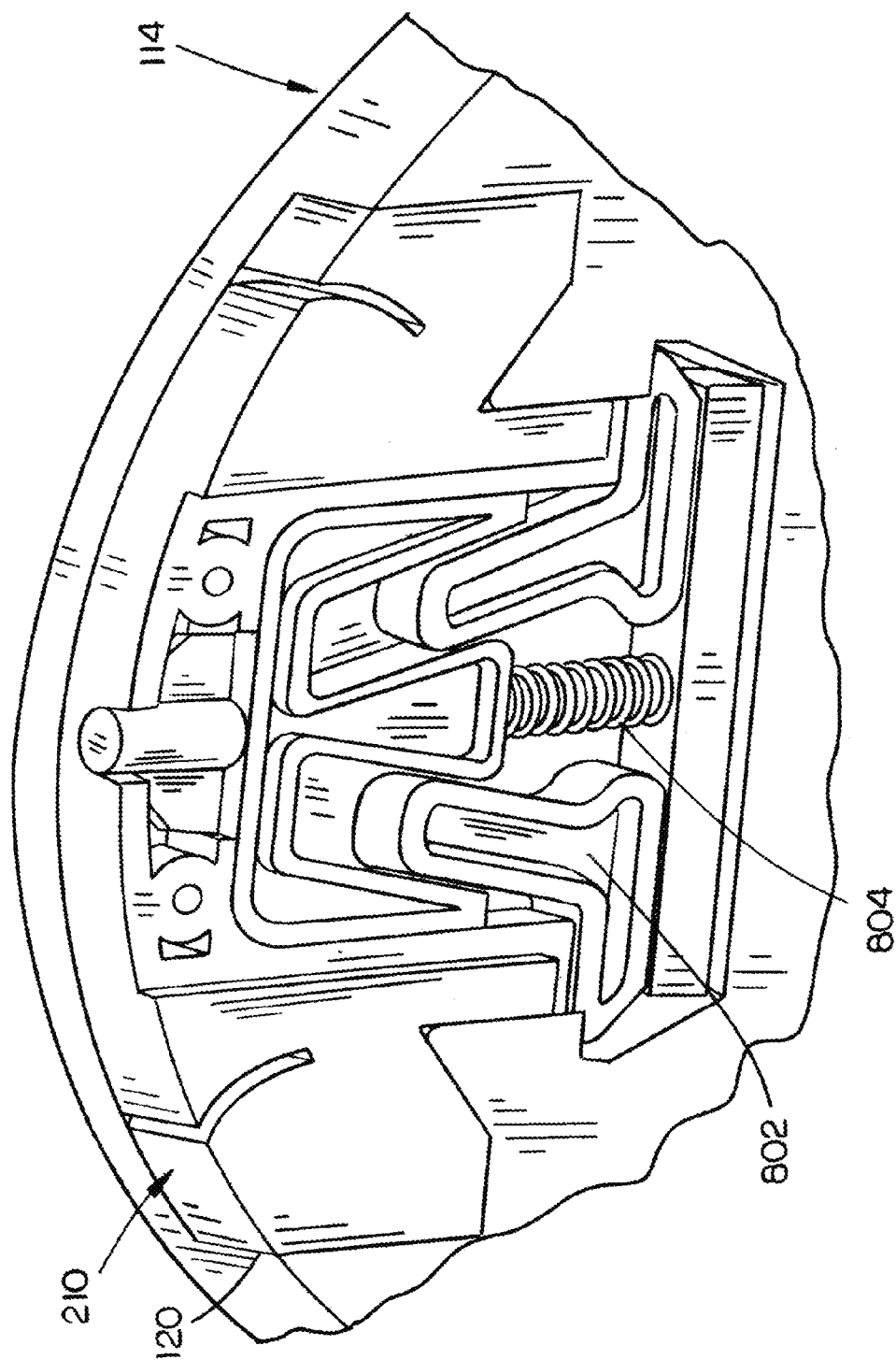

CROSS FLOW HORIZONTAL ROTARY LAWN MOWER WITH AIRFOIL BLADES

CROSS-REFERENCE TO RELATED APPLICATIONS

The present application is a non-provisional of U.S. provisional patent application 61/895,859 filed on Oct. 25, 2013. Likewise, the present application claims priority from U.S. non-provisional patent 13/768,856 filed Feb. 15, 2013, and Patent Cooperation Treaty patent application PCT/US14/16319 filed on Feb. 13, 2014. All of said patent applications are incorporated herein in their entirety.

FIELD OF THE INVENTION

The present Invention is directed generally toward lawnmowers and more particularly to lawnmower blade assemblies and lawnmower housings.

BACKGROUND OF THE INVENTION

Lawnmowers traditionally come in two varieties: rotary mowers, where blades rotate horizontally in a plane; and reel mowers, where helical blades rotate about an axis so that the helical blades can shear grass against a bedknife.

Rotary mowers have blades with a small cutting area, and the blades require very fast tip speeds to perform well. Typical tip speeds are greater than fifteen thousand feet per minute. This is necessary to achieve an acceptable cut, even when blades are sharp. Foreign objects struck by blades at these velocities can be very dangerous. Even though rotary mower decks and collection bags are required to be designed in accordance with various safety standards to minimize the risk of injury due to flying objects, many injuries still occur from ejected objects even when safety measures are in place.

In addition, many injuries occur from the blades themselves. Rotary mower blades are very large and heavy and will inflict grievous injury even at low speeds. Furthermore, decks for these blades are completely open underneath to accommodate the circular cut area and the need for the blades to cut at their tips. This large, open area increases the risk of foot, hand, or other body part mutilation, and increases the risk of the blades striking a foreign object.

Reel mowers have multiple helical blades (usually five or more) that rotate about a horizontal shaft; a stationary bedknife provides a shearing surface for the helical blades. The rotating helical blades of a reel mower typically operate at a lower speed than the blades of a rotary mower, but reel mowers are precision instruments that require frequent adjustment and precise operating conditions such as rotational speed and forward velocity. Reel mowers are also dangerous. Reel mowers must expose the entire front of the rotating helical blades to allow the blades to feed grass against a bedknife. Even while not in operation the helical blades may cause injury. In operation, accidental contact with a spinning helical blade will pull a hand or foot into the bedknife. Consequently, there is a need for a mower with a shielded and less exposed blade assembly to reduce the risk of injury.

Typical rotary lawnmower blades are generally heavy, flat elongated pieces of steel that rotate symmetrically about a rotatable vertical shaft. Rotary lawn mower blades have a sharpened leading edge, and the outer portion of the trailing edge is curved to create airflow to lift grass and blow clippings into a bag or out of a discharge passage.

SUMMARY OF THE INVENTION

Accordingly, the present invention is directed to a novel lawn mowing apparatus with a shielded blade assembly, configured to use a design configuration where the blade assembly rotates about an axis parallel to the ground. Blades are held by the blade assembly with the cutting edge of each blade oriented in the direction of rotation. This blade orientation requires the flow to be perpendicular to the blade.

For the present invention as the blade assembly rotates, the grass is sucked up into the blades, is at least cut or marginally cut, and discharged from the blade assembly. In a preferred embodiment the mower blade horizontal cutter assembly acts as a cross-flow fan airfoil.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which:

FIGS. 11A, 11B, and 11C are an exploded view of an embodiment of a horizontal rotary mower blade assembly radial blade cartridge and an exploded view of a portion of a rotor;

DETAILED DESCRIPTION

Reference will now be made to at least one embodiment of the subject matter disclosed, which is illustrated in the accompanying drawings. The scope of the invention is limited only by the claims; numerous alternatives, modifications and equivalents. For the purpose of clarity, technical material that is known in the technical fields related to the embodiments has not been described in detail to avoid unnecessarily obscuring the description.

In at least one embodiment of the present invention, a lawn mower cut quality is enhanced by airflow optimized for directing grass blades into the blade cutting path for at least one of marginal cutting or cutting before discharge. The invention teaches a unique cross-flow geometry for mowing turf.

Preventing grass buildup on the blade surface is an issue in turf mowers. The present invention controls the airflow so as to produce fine marginal cuts directed by the cross-flow airflow back into the freshly cut turf for beneficial decomposition. This is achieved by the blade assembly and housing geometry so as to control the flow of air into the blade assembly. This required considerable experimentation to determine the design parameters necessary to prevent this from happening and to also optimize cut performance. In at least one embodiment, a lawnmower utilizes a horizontally rotating blade assembly with the cutting edge of each blade in the blade assembly facing in the direction of rotation. Blades in the blade assembly are thin and have an edge geometry that is at an acute angle to the turf leaves to be cut; therefore, the blades continue to work effectively longer than blades in prior art lawnmowers and produce a healthier and less prone to tip browning cut. Because of the orientation of the blade assembly, the sharpness of the blade edge and the configuration of blades in the blade assembly, the blade assembly may operate at a lower, safer speed as compared to rotary lawnmowers and the blade assembly does not require a stationary straight blade (bed knife, cutter bar, shear bar, or the like) or an open front like a reel mower. The blade assembly may also be largely contained within a blade assembly guard to prevent accidental contact.

Figure 1:
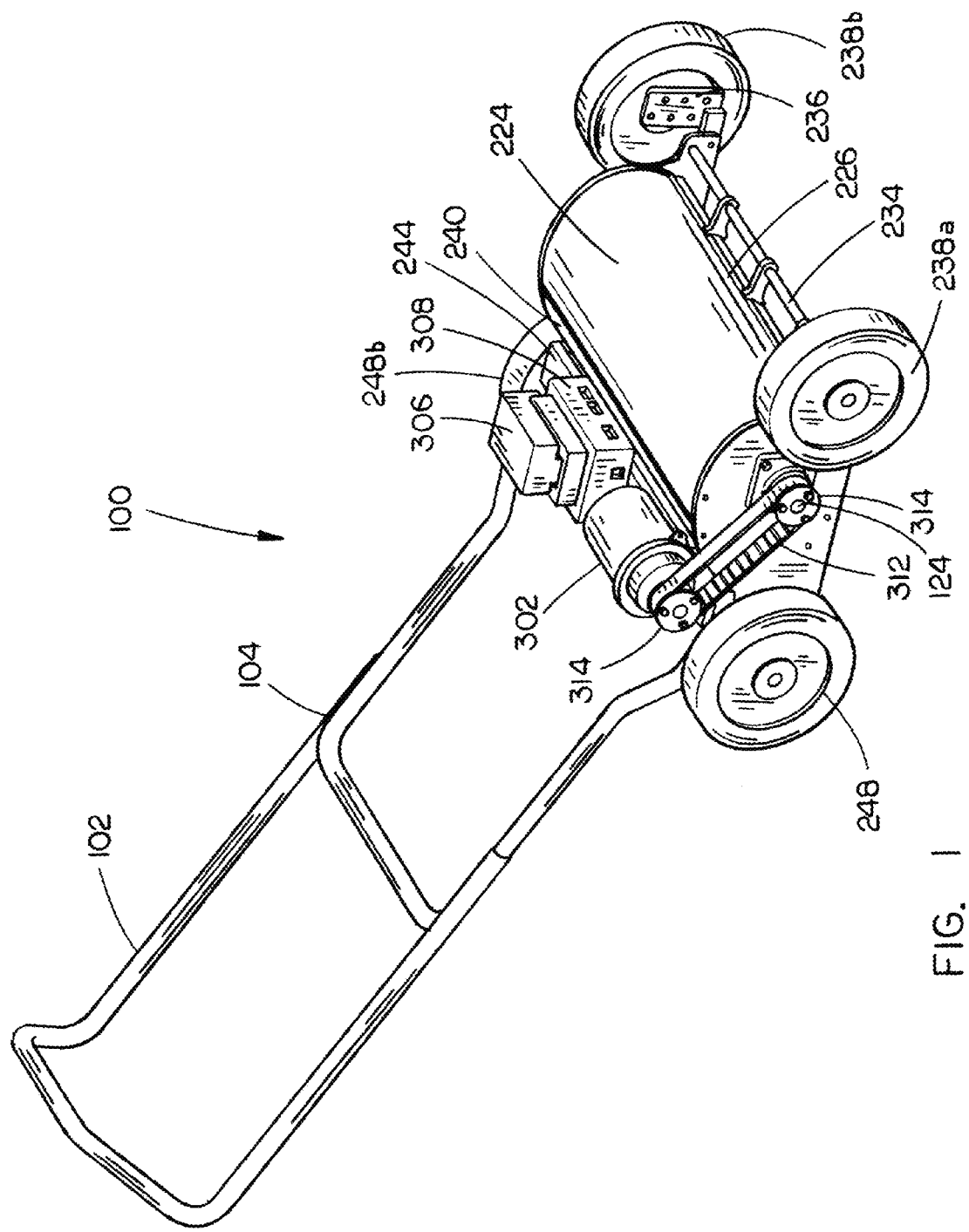
FIG. 1 is a perspective view of the drive side of a push type lawnmower with a blade assembly guard according to at least one embodiment of the present invention.

Referring to FIG. 1, a perspective view is shown of the right/front side (drive side) of a push type lawnmower 100 with a blade assembly guard according to at least one embodiment of the present invention. The lawnmower includes a foldable handle 102, a handle hinge 104 to fold the handle for storage and obstacle clearance, two front wheels, 238(a) and 238(b) and two rear wheels 248(a) and 248(b). In one embodiment of the present invention the wheels are adjustable and have mower height adjustment brackets 236. The mower in one embodiment of the present invention has a battery 306 with a battery charger 308 (for in situ battery pack line current charging or the like). The battery 306 is operably connected to a motor 302 which powers the rotation of the horizontal rotary mower blade assembly (here concealed by front housing 224). Alternatively, the mower may be powered by an electric generator (mower powered), gasoline, electricity or by other appropriate means. The motor 302 may engage the horizontal blade assembly through a drive, for example, a chain 312 which may include a belt or chain gear assembly. The drive chain 312 is operatively connected to the rotary drive shaft 124 which engages the rotation of a horizontal rotary mower blade assembly 110 (here concealed by the front housing 224). The front housing 224 combined with the rear housing 240 is hinged, for example, to provide access to the blade cartridge 210 and blades 112, and together define the top of the mower housing 200 according to at least one embodiment of the present invention. The horizontal rotary mower blade assembly (concealed by front housing 224) may also include a drive engaging mechanism 314 to facilitate a connection between the shaft 124 and a drive mechanism; for example, the drive engaging mechanism 314 may be a belt wheel to receive a drive belt connected to a motor.

The mower front foot guard assembly 234 serves multiple purposes. The front foot guard assembly 234 protects people from the blades as well as providing a supportive structure for the framework for the front end of the cross flow horizontal mower and is cable of pushing rocks or other objects away from the mower. The rear housing drive support frame 244 functions as the support frame for the mower 100 and functions as a framework to attach the motor 302, battery 306 and battery charging system 308 in one embodiment of the present invention.

Figure 2:
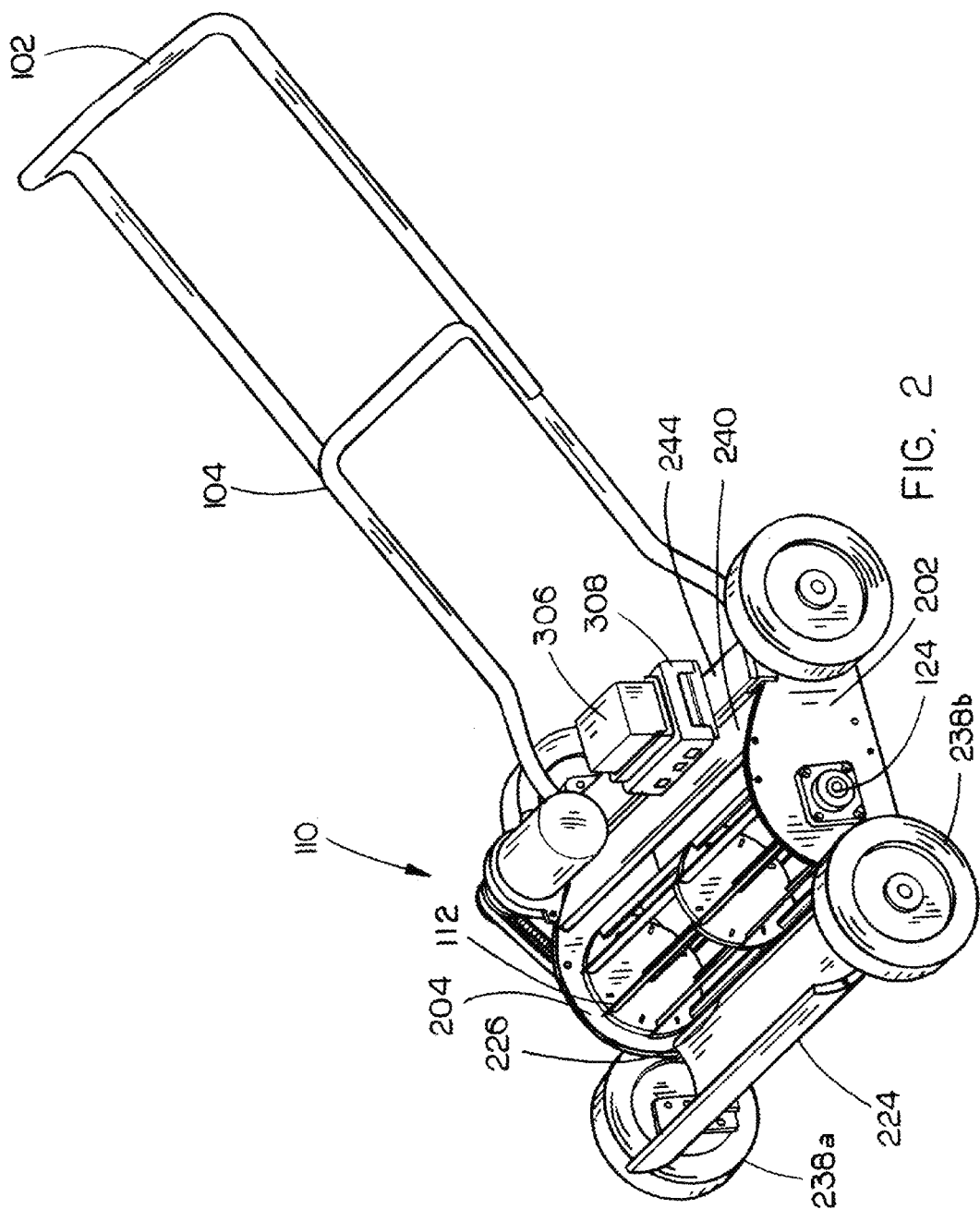
FIG. 2 is a perspective, exploded view, of the non-drive side push type lawnmower shown in FIG. 1, having a blade assembly according to at least one embodiment of the present invention.

Referring to FIG. 2, a perspective, exploded view of the push type lawnmower shown in FIG. 1, having a horizontal rotary mower blade assembly 110 according to at least one embodiment of the present invention is shown. The drive chain 312 is connected to a horizontal blade assembly shaft 124. The drive chain 312, in one embodiment of the present invention may be covered by a drive shield to prevent injuries due to contact with the drive chain 312 and to protect the integrity of the transfer belt 312 during operation.

The front housing 224 is shown in its open, non-operating position. The front housing 224 may include a hinge 226. The front housing 224 may include a blade assembly access panel to access the horizontal mower blade assembly 110 for maintenance and replacement of blades 112. A horizontal rotary mower blade assembly access panel may allow blades to be replaced quickly. In one embodiment of the present invention the front housing 224 may include a handle to allow easy access to the horizontal rotary mower blade assembly. In one embodiment of the present invention the horizontal rotary mower blade assembly may include a quick release option to allow changing the entire horizontal rotary mower blade assembly at one time. The front housing 224 may contain a latch or other similar device to lock the front housing 224 in place upon closing. The latch or locking system may operatively interface with the mower user interface controls 106 to shut down the mower when the front housing 224 is opened or ajar.

The horizontal rotary mower blade assembly 110 is enclosed by the housing 200 (222, 224, 240) preventing the exposure of blades 112 in the horizontal rotary mower blade assembly 110 (except as necessary for grass cutting as more fully described herein). The front housing 224 together with the rear housing 240 form the top of the crossflow mower housing. The crossflow mower housing may include a left housing side plate 202 and a right housing side plate 204 enclosing the sides of the horizontal rotary mower blade assembly 110. A portion of the crossflow mower housing including the top piece (front and rear housing interface) 502 (412, 414, FIG. 6) formed by the front housing 224 and the rear housing 240 may connect to the right side plate 204 and left side plate 202. The crossflow mower housing portion including the front housing 224 and the rear housing 240, left housing side plate 202 and right housing side plate 204 may closely surround a portion of the horizontal rotary mower blade assembly 110. An airflow produced by the horizontal rotary mower blade assembly 110 during operation may flow through the horizontal rotary mower blade assembly and may be contained within the boundaries of the right housing side plate 204 and the left housing side plate 202 (as will be more fully be described herein).

Figure 3:
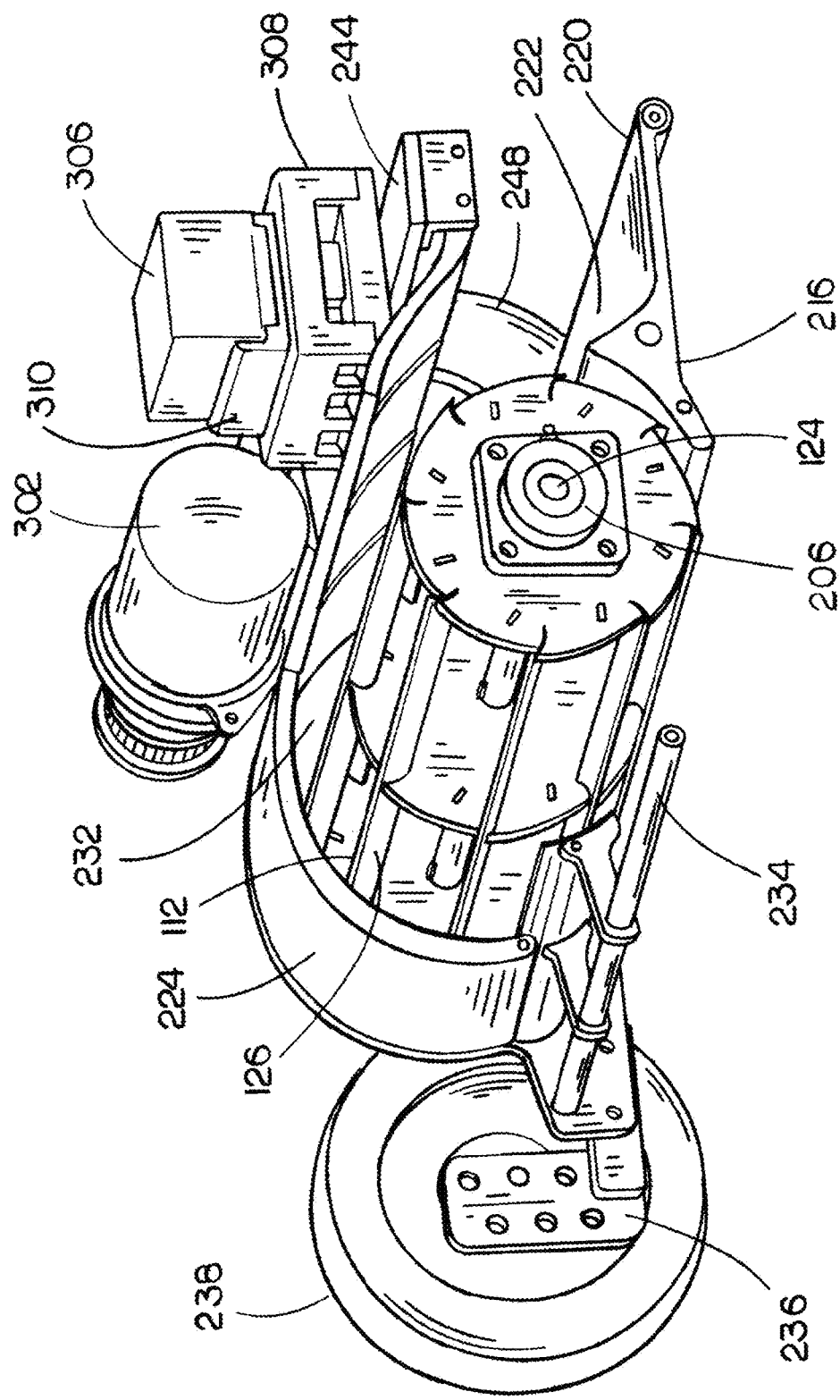
FIG. 3 is a perspective, partially exploded view of the push type lawnmower shown in FIG. 1, having a blade assembly according to at least one embodiment of the present invention.
Figure 12:
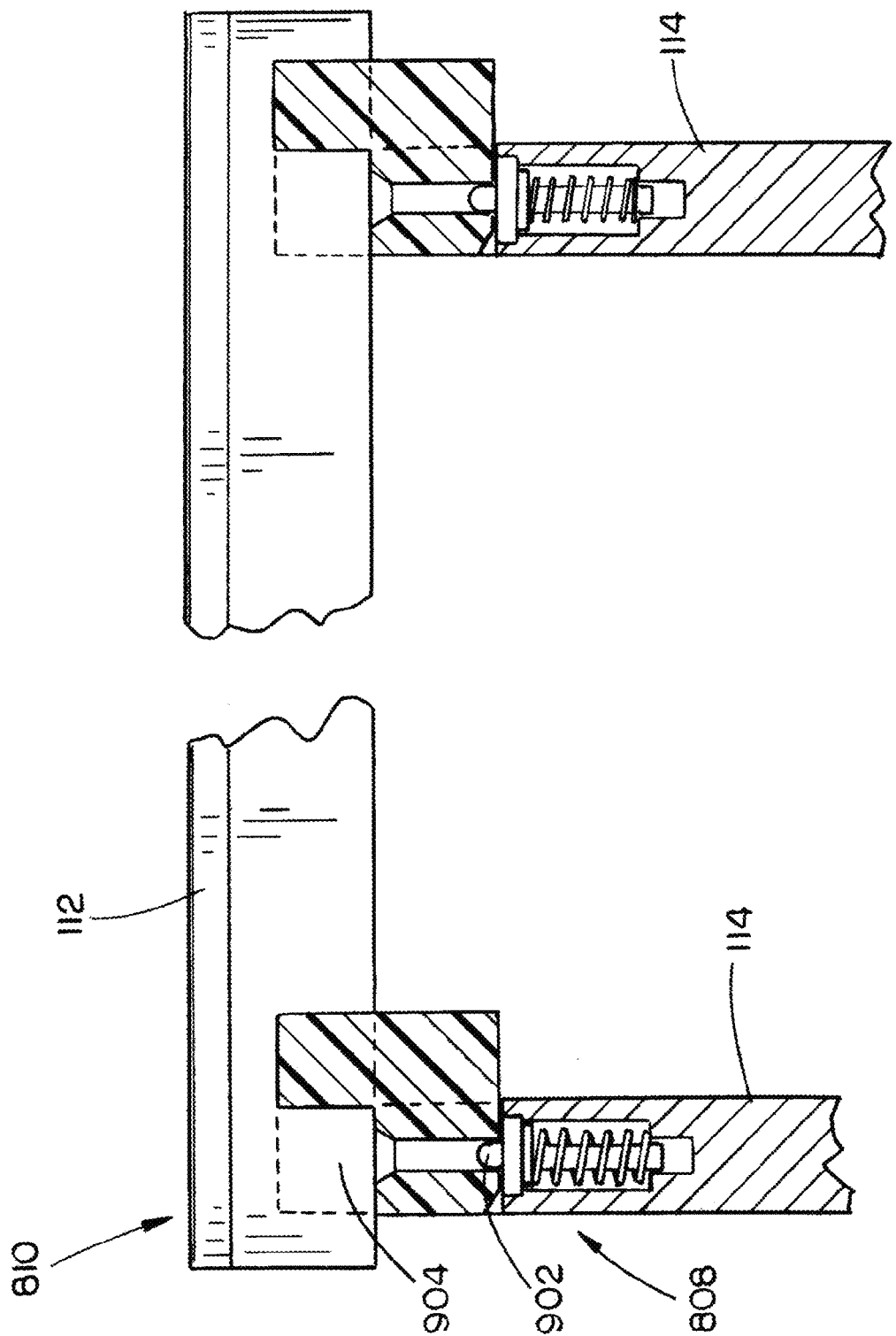
FIG. 12 is an exploded, cut away view of a horizontal rotary mower blade assembly axial blade cartridge and rotor connection means.
Figure 13:
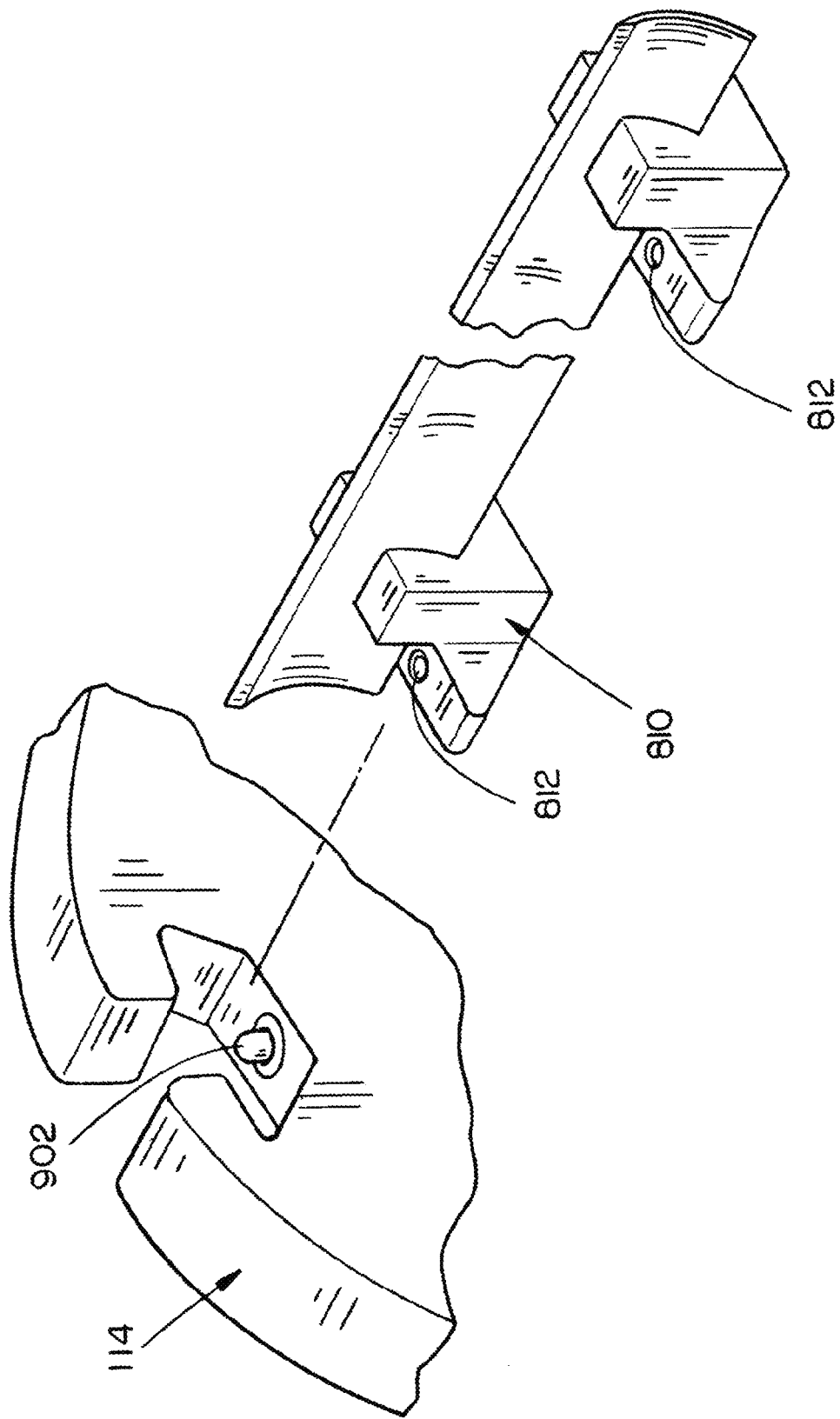
FIG. 13 is an exploded, cut away view of a horizontal rotary mower blade assembly axial blade cartridge and an exploded cut away view of an axial rotor blade retention slot.

Referring to FIG. 3, a perspective cut out view of the front left side of the cross flow mower showing the horizontal rotary mower blade assembly 110 according to at least one embodiment of the present invention is shown. The horizontal rotary mower blade assembly 110 may include a rotary drive shaft 124. The rotary drive shaft connected to a rotor 114 or a plurality of rotors 114. The rotors 114 provide attachment surfaces for a plurality of blade clamps 126. Each blade clamp 126 is configured to hold a blade 112 such that the cutting edge of the blade faces the direction of rotation of the horizontal blade assembly 110 when the blade assembly 110 is in operation (two embodiments are illustrated in FIGS. 11-13, for example, other configurations are contemplated by the invention). While FIG. 3 illustrates a plurality of blade clamps 126, other blade holding elements may be used to implement embodiments of the present invention. Each blade clamp 126 may hold a single blade 112 or in in some embodiments of the present invention the blade clamp 126 may hold a plurality of blades. Each plurality of blades having a cutting edge (112). The blade 112 may be straight or curved in cross-section to form a desired airfoil to produce in combination with the housing geometry a desired cross-flow.

A baffle 216 may define the back bottom part of the cross-flow mower housing. The baffle 216 divides an opening for the intake air and an opening for the exhaust air. The baffle 216 is connected to the right housing (drive side) plate 204 and the left housing (non-drive side) plate 202, as shown in FIG. 2. The baffle extends from left housing side plate to right housing side plate across the back side of the mower. The baffle 216 has an air flow control surface (front surface) 218 herein periodically referred to as the tongue or tongue surface. The baffle 216 has a tongue discharge baffle guide 222. In one embodiment of the present invention the tongue discharge baffle guide 222 guides or directs the cut grass clippings from the mower. In another embodiment of the present invention a bag or device to capture the cut blades of grass for later disposal may be affixed to the mower. The tongue foot guard 220 protects the mower operator.

The baffle 216 combined with the front housing 224 and the rear housing 240, the right housing side plate 204 and the left housing side plate 202 as shown in FIG. 2 form the horizontal rotary mower blade assembly crossflow mower housing which will be described herein in further detail.

Figure 4:
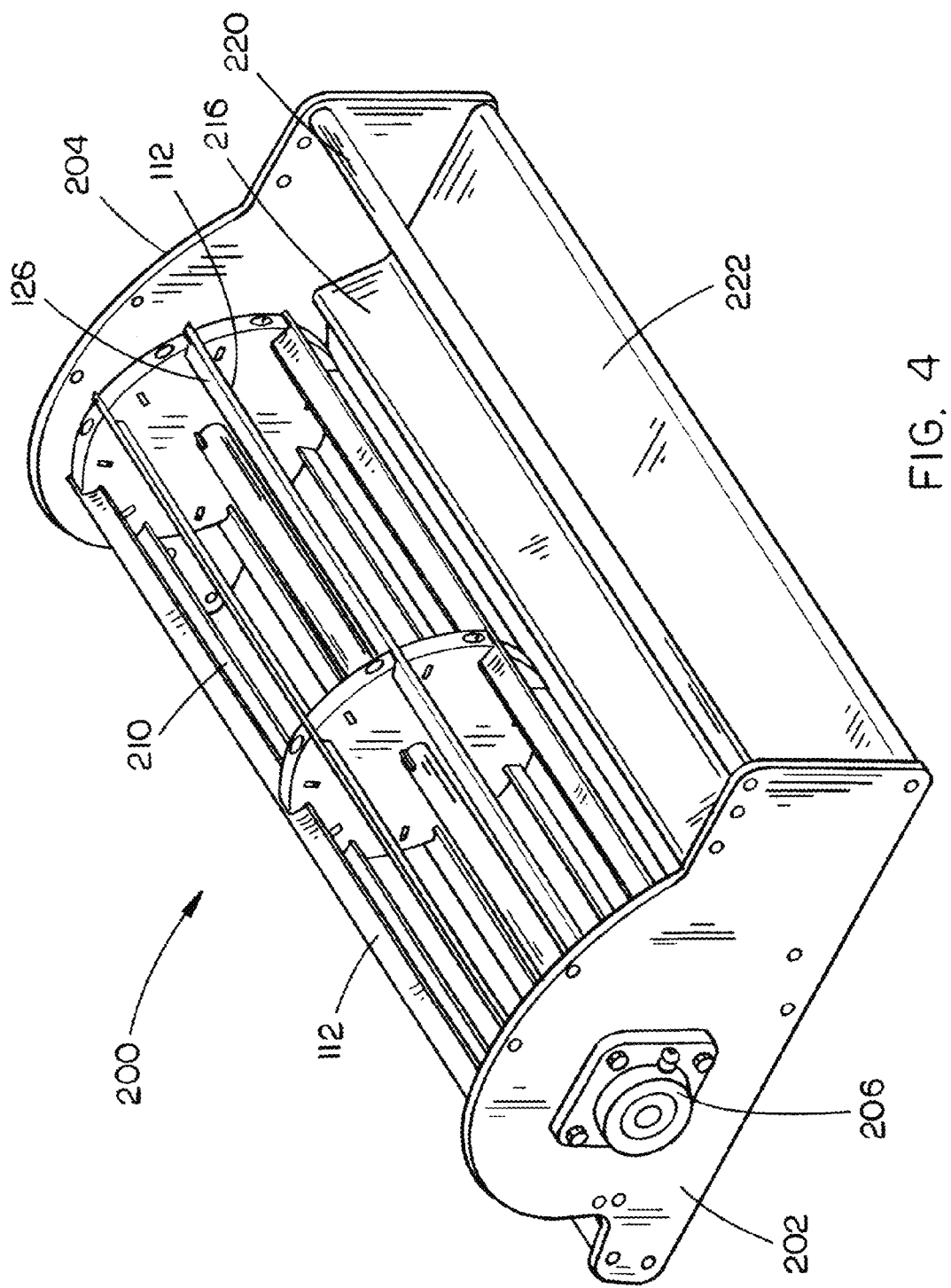
FIG. 4 is a perspective, close up view of the blade assembly positioned with the housing sides and bottom surface.

Referring to FIG. 4, a cut away view of a portion of the crossflow mower housing assembly with left housing side part 202 and right housing side part 204 and baffle 216. The baffle (tongue) 216 extends between left housing side part 202 and right housing side part 204 and is connected therein. The horizontal rotary mower blade assembly 110 as shown in FIG. 2 and FIG. 3 is shown. The horizontal rotary mower blade assembly includes a rotary drive shaft 124 (or other non-axle or shaft drive means for rotating the cutter assembly 110) extending through and connected to a plurality (or at least a pair) of rotors 114. The rotary drive shaft 124 spins the rotors 114 about a horizontal axis defined by the rotary drive shaft 124 (or drive means). A plurality of blade clamps 126 are connected to the rotors 114. A plurality of blades 112 are connected to the plurality of blade clamps 126. Each blade clamp 126 is configured to hold a blade 112 such that the cutting edge of each blade 112 faces the direction of rotation during normal operation. The said plurality of blades forming an airfoil as the horizontal blade assembly rotates (e.g. about the rotary drive shaft 124).

As described more fully herein, a blade assembly according to the present invention allows for inexpensive, replaceable blades 112. Whereas the blades of prior art rotary mowers are required to have certain characteristics of mass and ductility based on their mode of operation and tip speed to meet certain safety standards and testing requirements, blades 112 according to at least one embodiment of the present invention essentially comprise only a cutting edge as the blades are thin enough to cut grass without a sharpened edge (while meeting or exceeding best practice guidelines). Blade 112 edges according to at least one embodiment of the present invention may be harder and sharper than prior art blades (preferably having at least two differential hardnesses in cross-section).

Figure 5:
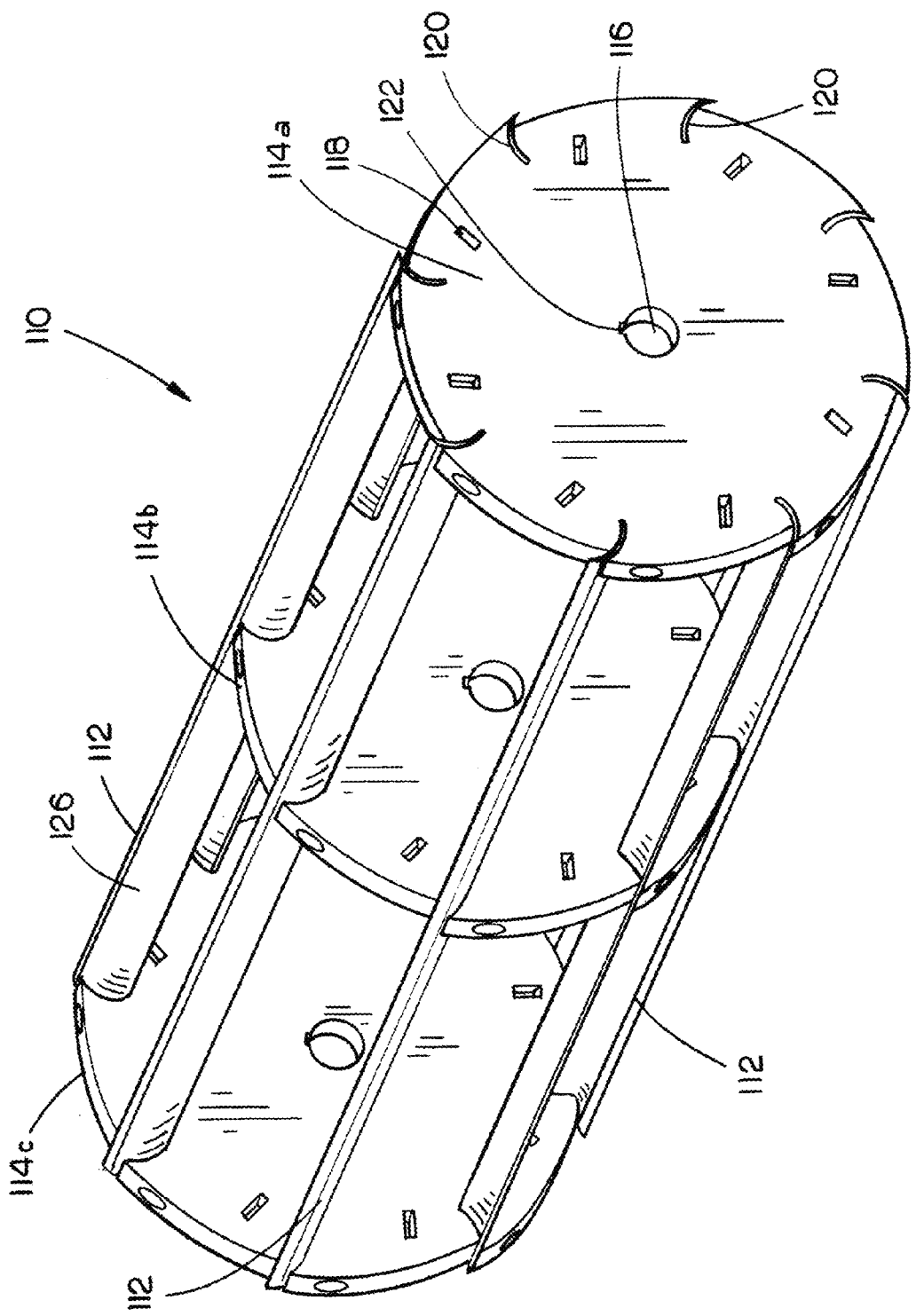
FIG. 5 is a perspective view of an embodiment of a horizontal rotary mower blade assembly of the present invention.

Referring to FIG. 5, a close up view of the horizontal rotary mower blade assembly 110 as shown in FIG. 2. The horizontal rotary mower blade assembly 110 defines a cylinder having a length and a diameter. The length of the horizontal blade assembly may be described as somewhat less than the distance between the left housing side plate 202 and the right housing side plate 204 as each side is positioned within the crossflow mower. The diameter of the horizontal rotary mower blade assembly may be defined as the diameter of a rotor 114. The horizontal rotary blade assembly includes a plurality of blade clamps 126. Each plurality of blade clamps holding blades 112. Each blade 112 comprising a cutting edge. The horizontal blade assembly 110 is positioned horizontally between the left housing side plate 202 and the right housing side plate 204 as shown in FIG. 4.

Because blades 112 according to at least one embodiment of the present invention are harder and sharper than prior art blades, they may operate at lower speeds, in the range of two thousand to sixty-five hundred feet per minute. In one embodiment, a shaft driving a blade assembly may rotate at an angular velocity of between three thousand and five thousand rotations per minute. Where a blade assembly has a diameter of five inches, such angular velocity may translate to a linear blade tip velocity of two thousand to sixty-five hundred feet per minute. (The current ANSI limit for mower blade tip speed is nineteen thousand feet per minute).

In one exemplary embodiment, the blades 112 travel at approximately sixty-two hundred feet per minute. Where a blade assembly has a diameter of 5.25 inch, a horizontal rotary mower engine would operate at approximately seventeen hundred rotations per minute. A motor turning at seventeen hundred rotations per minute with a 5.25 inch engine drive pulley driving a blade assembly with a 2.00 inch drive engaging mechanism will drive the blades 112 at approximately sixty-two hundred feet per minute (with the blade assembly rotating at forty-five hundred rotations per minute). Seventeen hundred rotations per minute is a fast idle for most internal combustion four-cycle mower engines.

Such an exemplary embodiment of the present invention has approximately one-third (⅓) the blade tip speed of a common rotary mower (nineteen thousand feet per minute ANSI limit). A common rotary mower with a vertical engine directly driving a twenty-one inch blade must turn at approximately thirty-three hundred rotations per minute (near some engines maximum operating limit of four thousand rotations per minute) to produce a blade tip speed of approximately eighteen thousand feet per minute. At such engine and blade tip speeds, common rotary mowers produce significant noise and air pollution (ninety dB and as much hydrocarbons and nitrogen oxides as four cars driven for the same length of time).

Furthermore, because the blades 112 are inserted into a blade clamp 126, they may be easily replaceable. For example, in at least one embodiment, the blades 112 are modified utility knife blades.

Rotary blades require a high tip speed, in the range of fifteen to nineteen thousand feet per minute, to adequately cut. Because of the high tip speed, rotary blades must be made from heavy gage, soft, ductile steel to meet ANSI test standards and other safety requirements. Hardness is the primary factor that affects blade sharpness retention, so sharpness of rotary blades degrades quickly because they must be made of ductile steel (less than Rockwell C 40 steel). Typically rotary blades are used for a season or more and are sharpened multiple times during their useful life. Sharpening is not technically difficult but takes time; and if rotary blades are not sharpened regularly, cut quality suffers.

Because blades 112 in embodiments of the present invention operate at lower tip speed (between two thousand and sixty-five hundred feet per minute in some embodiments of the present invention as compared to nineteen thousand feet per minute in prior art mowers) the power source driving the blades 112 may be less powerful, operate more efficiently and operate at significantly lower engine speed. Less powerful, more efficient power sources may be lighter and more environmentally friendly as compared to motors used in prior art mowers.

Reel mowers use hardened helical blades but because of the type of cutting action (shearing) they require a technically difficult and time-consuming process to sharpen the blades and adjust the blade alignment. That process usually requires a trained professional.

Blades 112 according to at least one embodiment of the present invention may be manufactured using a very cost effective process similar to the manufacture of utility knife blades. In at least one embodiment of the present invention, blades 112 may be made of 1095 grade carbon steel. In at least one embodiment of the present invention blades 112 may have a blade thickness maximum of 0.075 inch or 1.9 mm. The core of blades 112 may have a core hardness of less than 50 HRC and the cutting edge of each of said plurality of blades may have a hardness of greater than 50 HRC.

Figure 6:
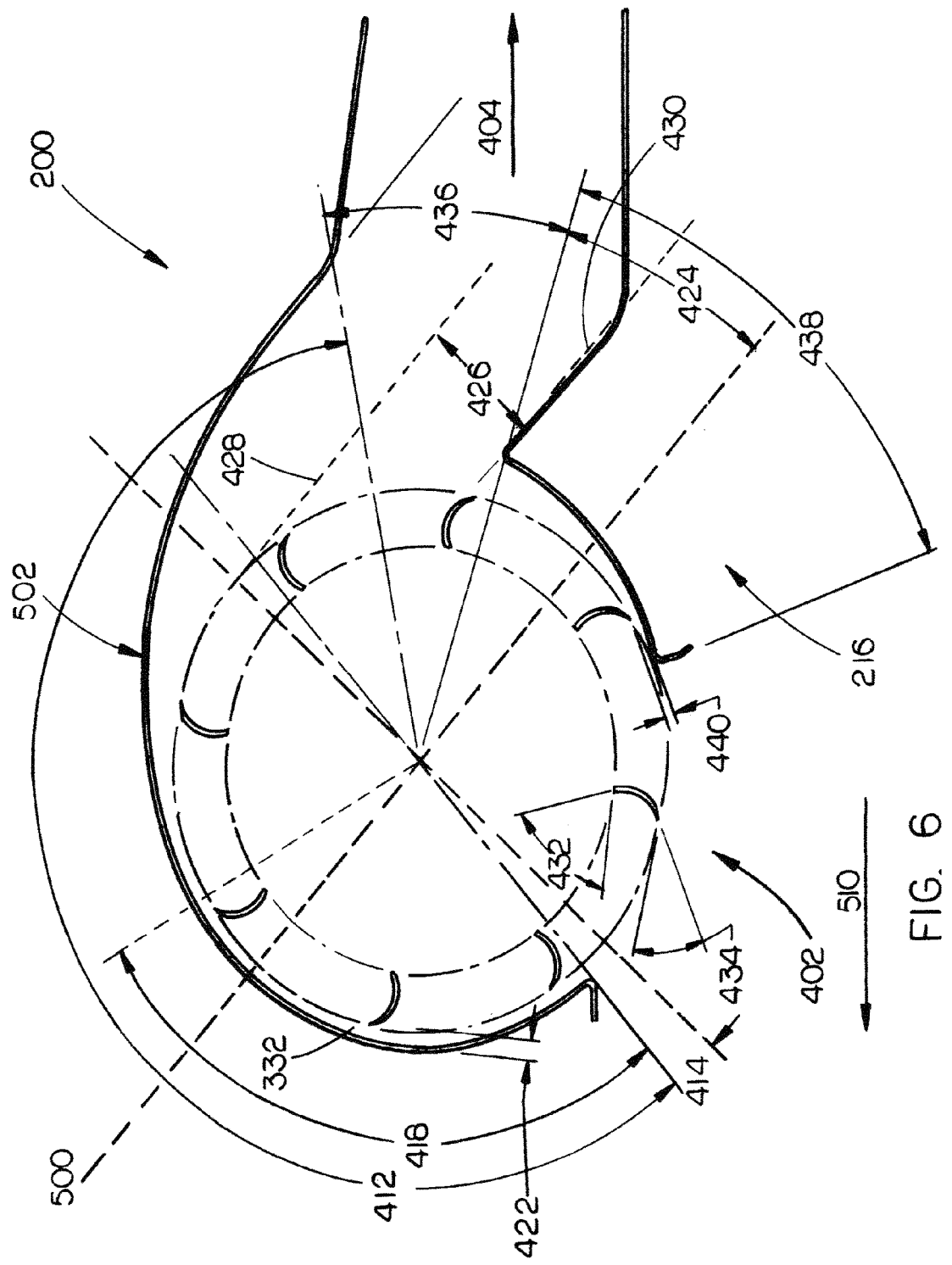
FIG. 6 is a diagrammatic cross-sectional view illustrating a currently preferred crossflow horizontal mower geometry.

Referring to FIG. 6, a detailed diagram of the crossflow mower housing geometry. One embodiment of the housing design for the cross flow mower is illustrated and described fully herein. FIG. 6 is an illustration of a cross-section of the crossflow mower housing assembly. The top piece of the crossflow mower housing assembly in one embodiment of the present invention includes the front housing 224 combined with the rear housing 240 to construct the top piece of the housing as shown in FIG. 1. The geometry of the top 502 and the baffle 218 are illustrated in FIG. 6. The direction of normal movement of the cross flow mower for at least one embodiment of the present invention is in the direction as indicated by the arrow 510. The direction of movement coincides with the front of the mower. The direction of the air is drawn into the housing as from the front and underside of the crossflow mower. The top of the housing 502 (the front housing 224 and the rear housing 240 as shown in FIG. 1) and the baffle 216 define the intake opening 402 and the exhaust opening 404.

One of ordinary skills in the art may describe this housing as being made from two circular arcs one with the center at the rotor center and the other being larger with its center located in the blade interior at the bottom. One of ordinary skills in the art would recognize such a housing as being described as a log spiral housing with very small radial width. The front end housing is extended closer to the ground and the baffle 216 or tongue, as it may be referred to by one of ordinary skill in the art, has been reconfigured to provide optimum performance of the crossflow mower.

The Bold dotted lines 500 (FIG. 6) are the datum reference lines for purposes of demonstrating the geometry of the crossflow mower housing assembly. One embodiment of the present invention defines the larger circular arc as the rear wall leading edge to end of log spiral arc angle 412 to be 210 degrees. The rear wall leading edge to rotor vertical axis angle 414 is optimally 7 degrees. The rear wall height angel 418 is optimally 101 degrees. In one embodiment of the present invention, the rear wall height angle may be described as the angular distance from the leading edge 410 to the point where the clearance between the horizontal rotary blade assembly and the housing wall increase shown at point 442 in FIG. 6. One of ordinary skill in the art would recognize point 442 as being the ending of the small radial width and the commencing of the logarithmic distance when referring to the log spiral housing.

The blade clearance at the vortex wall 440 is optimally, mathematically described as 0.02×D2. Where D2 defines the outside diameter of the horizontal rotary blade assembly. The blade clearance at the leading edge 422 is optimally 0.04×D2. The distance 426 from the tongue wall top edge to the blade top tangent line 428 is mathematically described as 0.26×D2. Where D2 defines the outside diameter of the horizontal rotary blade assembly. The measured angle 430 describing the tongue wall inside edge to the zero datum angle is measured in at least one embodiment of the present invention in the range of 15 degrees to 20 degrees. The blade trailing edge angle 432 it optimally 70 to 80 degrees. The blade leading edge angle 434 is optimally 31 to 35 degrees.

The tongue wall or baffle 218 leading edge to the end of log spiral arc angle 436 is optimally 28 degrees. The tongue or baffle 218 thickness angle 438 is optimally 52 degrees.

Figure 16:
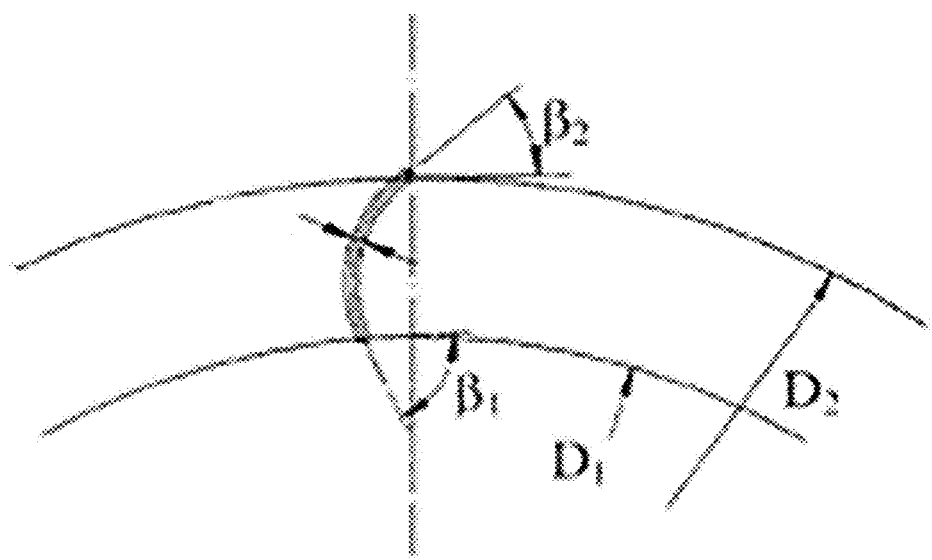
FIG. 16 is a diagram of mower blade angle relationships.

Referring to FIG. 16, for optimal flow and efficiency conventional theory recommends that the blade angles range from $\beta_1$ =60 to 90 degrees with 90 degrees optimal and $\beta_2$ =20 to 40 degrees with 26 degrees optimal. Whereby the angle $\beta_2$ is defined as the blade leading edge angle and the angle $\beta_1$ is defined as the blade trailing edge angle as shown in the figure herein. Performance variation is slight for values of $\beta_2$ between 60 and 90, but a variation of $\beta_1$ does have an impact on flow and efficiency. Experiments for this invention were run for values of $\beta_2$ from 18 degrees to 44 degrees and it was determined for at least one embodiment that 33 degrees provided the best cut quality with acceptable flow and efficiency. In at least one embodiment of the present invention a range of 31 degrees to 35 degrees for $\beta_2$ is acceptable with the optimum value of 33 degrees. The value for $\beta_1$ was purposely changed from approximately 60 to 175 degrees in conjunction with variation to other parameters including $\beta_2$. In at least one embodiment of the present invention the value of $\beta_1$ functions well in the range of 60 to 95 degrees with the optimal angular measurement of 70 to 80 degrees.

A width distance for the fan ranging from 1.3 to 1.55 times the D2 outer diameter of the blade assembly is employed. The spacing for the rotors 114 must be approximately this ratio or greater. The ratio of D1 to D2 should be between 0.7 and 0.85 with 0.84 being optimal for the design of one embodiment of the present invention. Most of the invention embodiments were either on the high end of this range or slightly over. Embodiments with values as high as 0.9 performed well during trials.

The rotor 114 as shown in FIG. 5 has a width W. The width W of the rotor 114 is optimal for at least one embodiment of the present invention when it is based on the ratio of a length L of a horizontal rotary mower assembly 110 as shown in FIG. 5 and a diameter D2. A diameter D2, as described previously is the outer diameter of the horizontal rotary mower blade assembly. The optimum ratio, mathematically L divided by D2 is optimally 1.46.

The rotational velocities for this embodiment to achieve optimum cut performance were approximately 3200 RPM for a 2 blade arrangement and 2500 RPM for a 6 blade arrangement. The 2500 RPM equates to a blade tip speed of approximately 3,900 feet per minute (fpm) which is significantly lower than a typical rotary mower that have a tip speed between 15,000 and 19,000 fpm.

Figure 7:
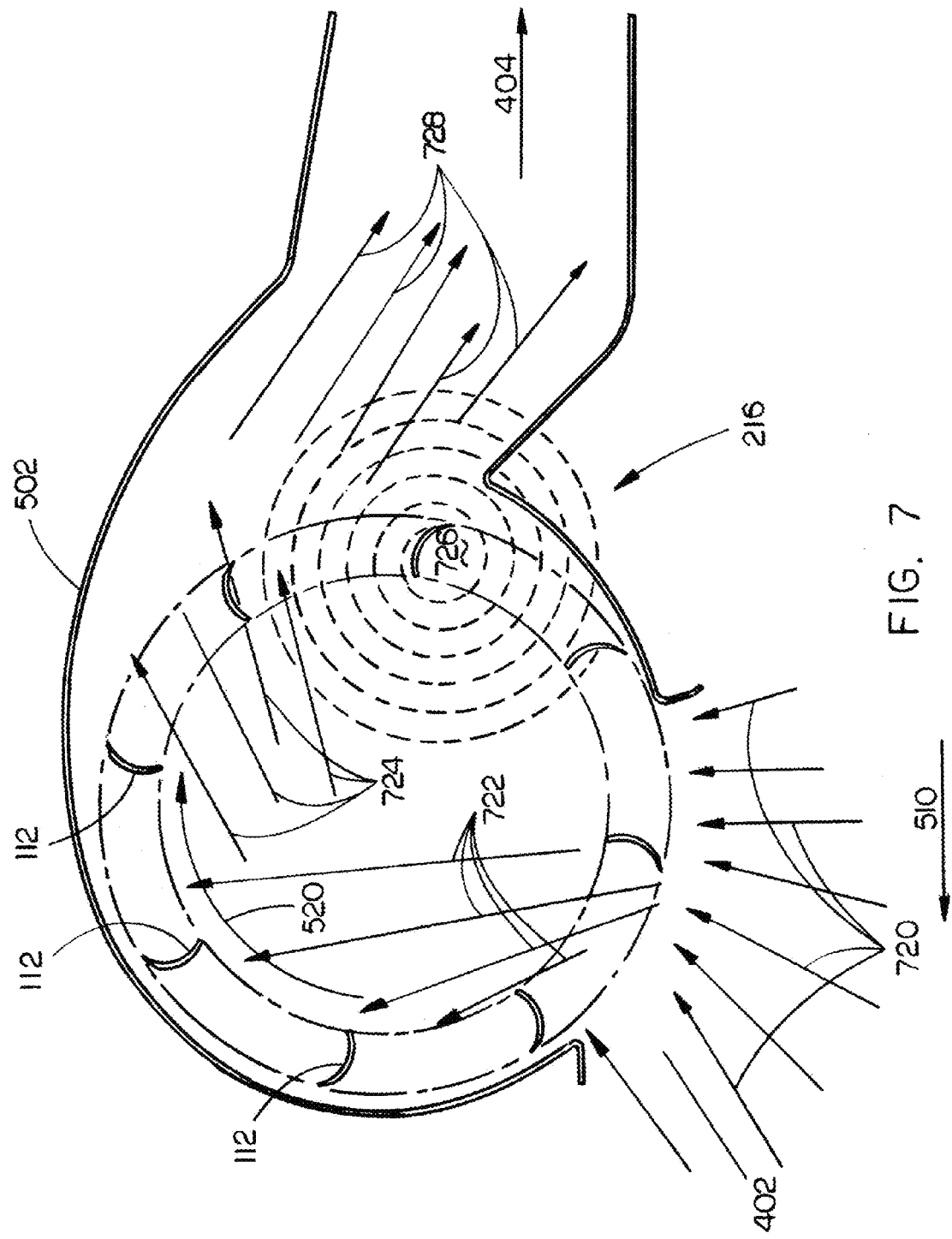
FIG. 7 is an illustration of the airflow pattern as it flows through the crossflow horizontal mower housing in at least one embodiment of the present invention.

Referring to FIG. 7, an illustration of the airflow pattern as it flows through the crossflow mower housing 200 in one embodiment of the present invention. The crossflow mower is traveling forward which is defined as the normal direction of operation and is indicated by arrow 510. The crossflow mower housing top surface 502 (which is the combination of the front housing 224 and rear housing 240 as shown in FIG. 1.) and the baffle 216 substantially cover at least a portion of the horizontal rotary blade assembly 110. The mower housing top surface 502 and the mower housing bottom surface or baffle 216 define the intake opening 402 and the exhaust opening 404. In one embodiment of the present invention the intake opening 402 has a width of 50 percent to 75 percent of the diameter of the horizontal rotary blade assembly. In one embodiment the exhaust opening, 404 has a width of 50 to 70 percent of the diameter of the horizontal rotary blade assembly.

FIG. 7 show a horizontal rotary blade assembly 110 having a plurality of blades 112. The horizontal rotary blade assembly rotates (e.g., about the rotary drive shaft 124) as shown in FIG. 1. The direction of rotation of the horizontal blade assembly 110 is opposite the direction of the rotation of the wheels (238, 248) in a mowing operation. The arrow 520 represents the rotation of the horizontal rotary blade assembly in its normal operation. The arrows (720, 722, 724, and 728) are illustrative of the flow pattern which the air travels from the intake opening 402 through the exhaust opening 404.

The design of the crossflow mower housing in one embodiment of the current invention allows for the optimum location and size of the internal vortex 726. The vortex 726 is being pushed down by the low radius log spiral housing. It is also being directed down and back by the large shaped baffle (tongue) 216. The large shaped baffle 216 size and shape is primarily responsible for the size and position of the vortex. The greatest inflow of air is closest to the front end of the intake opening.

The main air flow moves transversely across the blade assembly. A phenomenon particular to the crossflow fan is that, as the blades rotate, the local air incidence angle changes. The result is that in certain positions the blades act as compressors (pressure increase), while at other azimuthal locations the blades act as turbines (pressure decrease) this causes air to travel through the crossflow fan cylindrical blade assembly entering on one side and exiting on the opposite side of the blade assembly. An objective of the present invention is cut quality. Another objective is controlling grass buildup on the blade surface due to the location of the suction or in flow of air into the blade assembly. A typical crossflow fan uses an impeller with 25 to 35 forward curved blades, placed in a housing consisting of a rear wall and vortex wall (tongue). Some of the embodiments of the present invention used 2, 3, 4, 6, and 8 blade arrangements. This is fewer than convention dictates. The airflow and efficiency performance increases as does the production and maintenance costs as the number of blades increase. The present invention achieved acceptable performance with two blades and exceptional performance with six and eight blade configurations. The number of blades considered for the cross flow mower range from two to thirty-six with the optimal number of eight.

In one embodiment of the present invention the horizontal rotary mower blade assembly may be defined as a cylinder (as shown in FIG. 5) with a length and a diameter of the rotor 114. As shown in FIG. 5 the horizontal blade assembly may have a circumference having an arc length of 360 degrees defined by 360 radii with top most radius being approximately zero. The housing 200 (FIG. 6) including the front housing 224 and the rear housing 240 (FIG. 1) and the baffle 216 may substantially surround the horizontal blade assembly. The front housing 224 and baffle 216 combining to define an intake opening 402 (FIG. 4). The rear housing 240 and baffle 216 (FIG. 3, FIG. 4 and FIG. 6) define the housing exhaust opening 404. The housing intake opening 402 beginning between 225 and 200 radii degree radii of the horizontal rotary mower blade assembly 110 and ending at between 170 and 150 degree radii of said horizontal rotary mower blade assembly 110. Said housing exhaust opening 404 beginning at between the 60 and 80 degree radii of said horizontal rotary blade assembly 110 and ending between the 120 and 130 degree radii of said horizontal rotary blade assembly 110.

In one embodiment of the present invention is further defined as having the housing intake opening 402 has an arc length of between 60 and 70 degrees and said exhaust opening 404 having an arc length of between 40 and 70 degrees.

In one embodiment of the present invention 100 the baffle 218 as shown in FIG. 3 and FIG. 6 where said baffle having at least one dimension approximately equal to the radius of said horizontal rotary mower blade assembly 110. The baffle (tongue) 216 maybe defined as having a curved surface nearest the rotational arc of said horizontal rotary blade assembly 110 which varies in distance from the rotational arc (axis). The baffle 216 defines as a substantially equal annular space 232 between the housing and the horizontal rotary blade assembly 110 by forming a substantially constant radius from approximately 220 degree to 355 degrees. The opening distance to the horizontal rotary mower blade assembly 110 blade arc varies between the arc length defined by the housing bottom surface between approximately 350 and 60 degrees.

The design of the crossflow mower housing 200 in one embodiment of the present invention 100 closely surrounding the horizontal rotary blade assembly 110, may be configured to maintain and direct an airflow produced by the rotation of the blade assembly 110 to direct grass clippings toward a clippings bag or an opening where grass clippings are ejected.

In at least one embodiment of the present invention, the mower 100 has a blade assembly configured to rotate horizontally. The blade assembly may include a shaft 124, rotors 114 connected to the shaft 124, and blade clamps 126 holding blades 112 connected to the rotors as shown in FIG. 3 and FIG. 4. As the shaft 124 (or the like) turns, the cutting edge of each blade 112 cuts the grass in its path of travel. Because the blade assembly rotates substantially faster than the forward velocity of any mower, the action of the blade assembly may create a gradient in the length of grass in the immediate vicinity of the blade assembly. For example, grass may be shortest directly below the shaft 124 where the cutting edge of each blade 112 passes closest to the ground, and progressively longer as the blades 112 rotate until the blades 112 reach a point in the rotation when they are no longer cutting any grass. Such mowing action may progressively remove several portions of each blade of grass until the grass is cut to its shortest length. A mower according to at least one embodiment of the present invention effectively mulches grass clippings, and smaller clippings are easier to transport through airflow. The cut ends of grass are substantially similar to those achieved with a reel mower.

The aesthetic quality and health of a lawn cut with a reel mower is far superior to that of a rotary mower. Rotary mowers leave the cut ends ragged while the reel mower's shearing cut leaves cut ends relatively clean. A ragged edge leaves grass more prone to disease. In at least one embodiment of the present invention, the cut quality produced by a horizontal rotary mower 100 may be significantly better than a rotary mower and closely match the cut quality of a reel mower.

Figure 8:
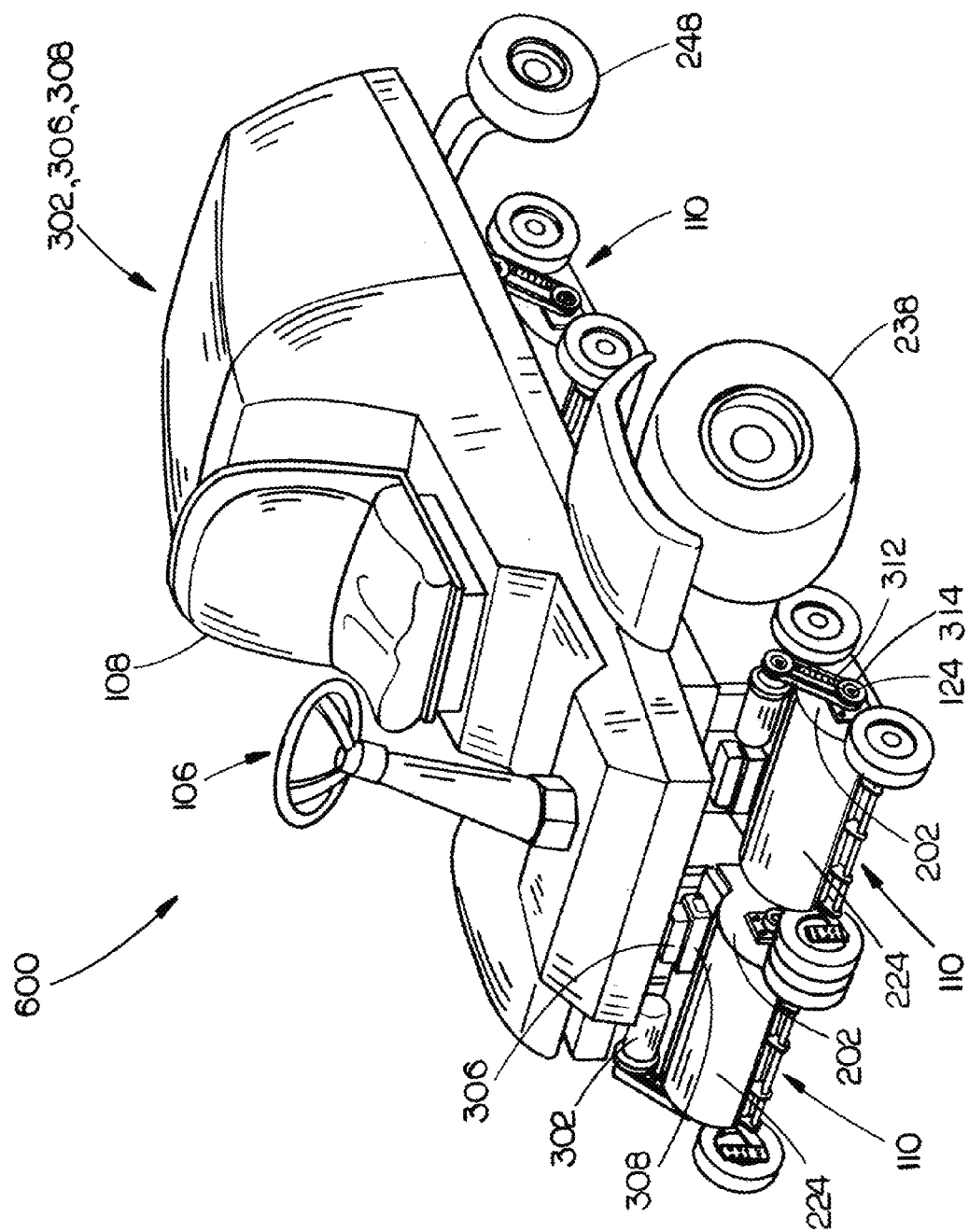
FIG. 8 is a perspective view of a riding type lawnmower according to at least one embodiment of the present invention.
Figure 14A:
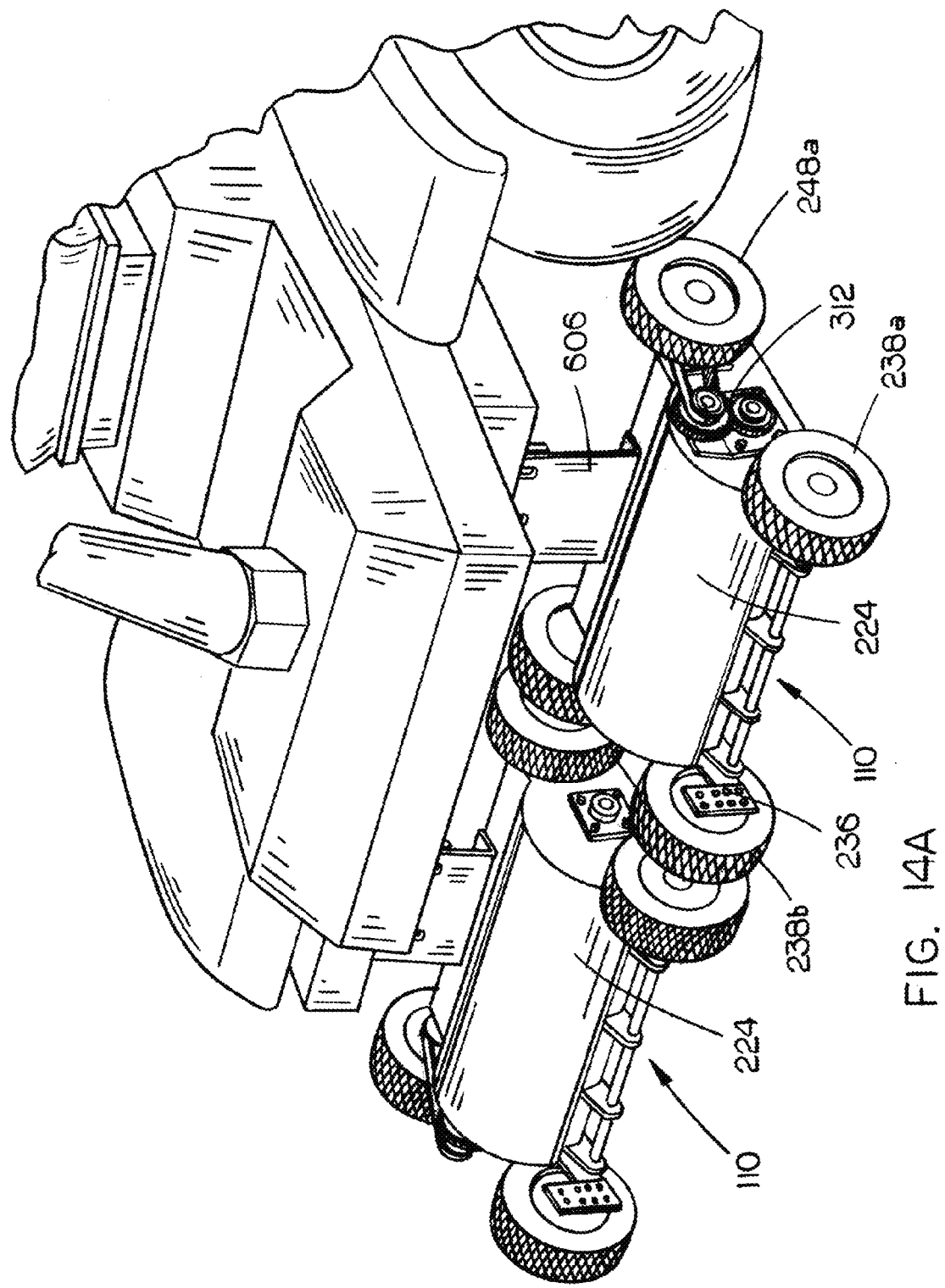
FIG. 14A is an exploded view of a front portion of a wheel driven ganged mower assembly of the present invention on a zero-turning radius type mower.

Referring to FIG. 8, a perspective view of riding type lawnmower 600 according to at least one embodiment of the present invention is shown. In at least one embodiment of the present invention, a riding type lawnmower 600 includes an operator seat 108 with mower user interface controls 106 in close proximity to the operator seat 108. In one embodiment of the present invention, the riding type lawnmower may include a motor 302, a battery 306, a drive assembly 300 (concealed beneath and behind the driver seat), front wheels 238 and rear wheels 248 which propel the riding type lawnmower across the surface. In other embodiments of the present invention means for powering the riding type mower may be by gasoline or other appropriate means. One embodiment of the present invention includes a plurality of horizontal rotary blade assemblies 110 (concealed within the housing front 224, and left housing side plate 202). The horizontal rotary blade assembly 110 has a motor 302 powered by a battery 306 which is operably connected to a battery charger 308. Alternatively, the horizontal rotary motor blade assembly 110 could be powered by gasoline or other appropriate means. The motor 302 may engage the horizontal rotary mower blade assembly 110 through some type of drive chain 312 which may include a belt or chain gear assembly. The drive chain 312 is operatively connected to the rotary drive shaft 124 engaging the rotation of a horizontal rotary blade assembly 110 (concealed by the front housing 224). The front housing 224 combined with the rear housing 240 define the housing top piece 502 (FIG. 6) of the crossflow mower housing according to at least one embodiment of the present invention. The blade assembly (concealed by front housing 224) may also include a drive engaging mechanism 314 to facilitate a connection between the shaft 124 and a drive mechanism; for example, the drive engaging mechanism 314 may be a belt wheel to receive a drive belt connected to a motor. In another embodiment (FIG. 14A), the ganged belly mower assembly (for use on a tractor or zero-turn radius mower) may be driven from the mower deck wheels or vehicle wheels (via a mechanical or electrical connection). Likewise, a gas powered electric generator on a towing vehicle or a large battery may be utilized to power each individual mower deck assembly.

The horizontal rotary mower blade assembly 110 may be connected to the riding type lawnmower within an under-mounted bracket system 606. The horizontal rotary mower blade assembly 110, in one embodiment of the present invention may include an access panel in the front housing 224 having quick access to allow maintenance and replacement of blades in the blade assembly. A blade assembly useful in this embodiment of the present invention may be as described herein.

Figure 9:
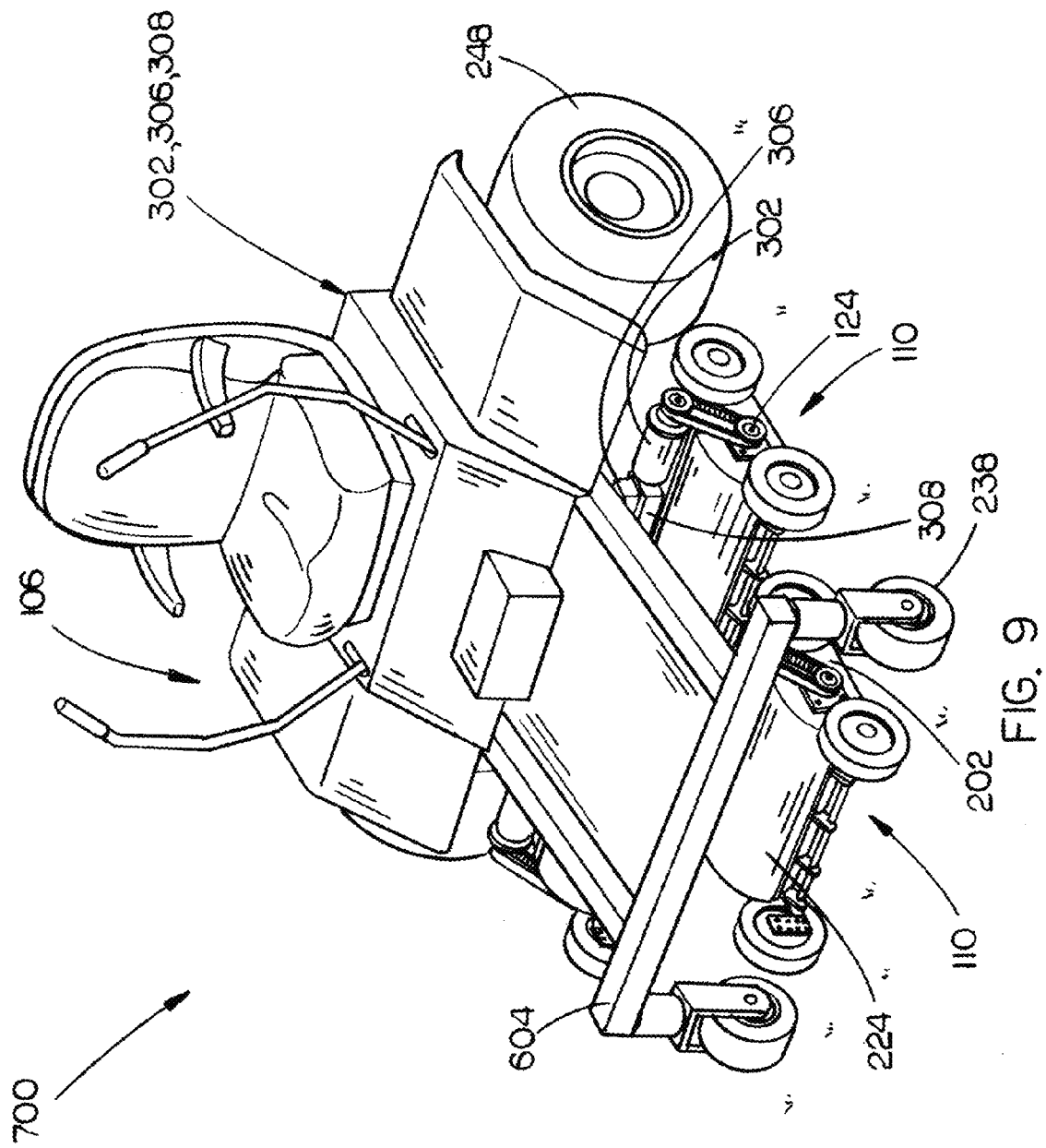
FIG. 9 is a perspective view of a zero-turning radius mower according to at least one embodiment of the present invention.

Referring to FIG. 9, a perspective view of a zero-turning radius mower 700 according to at least one embodiment of the present invention. The zero-turning radius mower 700 includes an operator seat 108 with mower user interface controls 106 in close proximity to the operator seat 108. In one embodiment of the present invention, the riding type mower may include a motor 302, a battery 306 and a battery charger 308 (concealed beneath the driver seat). In other embodiments of the present invention means for powering the zero-turning radius mower 700 may be by gasoline or other appropriate means. A plurality of horizontal rotary mower blade assemblies 110 are concealed within the housing front 224, and left housing side plate 202. The horizontal rotary mower blade assembly 110 has a motor 302 powered by a battery 306 which is operably connected to a battery charger 308. Alternatively, the horizontal rotary mower blade assembly could be powered by gasoline or other appropriate means. The motor 302 may engage the horizontal rotary mower blade assembly 110 through some type of drive chain 312 which may include a belt or chain gear assembly. The drive chain 312 is operatively connected to the rotary drive shaft 124 engages the rotation of a horizontal rotary mower blade assembly 110 (concealed by the front housing 224). The front housing 224 combined with the rear housing 240 define the housing top piece 502 (FIG. 6) of the crossflow mower. The horizontal rotary mower blade assembly 110 (concealed by front housing 224) may also include a drive engaging mechanism 314 to facilitate a connection between the shaft 124 and a drive mechanism; for example, the drive engaging mechanism 314 may be a belt wheel to receive a drive belt connected to a motor.

The horizontal rotary mower blade assembly 110 may be operatively connected to the zero-turning radius mower 700 by a framework 604. The horizontal rotary mower blade assembly 110 is operatively connected to the zero-turning radius mower 700 and controlled by the user through the mower user interface/controls 106. The horizontal blade assembly 110, in one embodiment of the present invention may include an access panel in the front housing 224 having quick access to allow maintenance and replacement of blades in the blade assembly. A blade assembly useful in this embodiment of the present invention may be as described herein.

Figure 10:
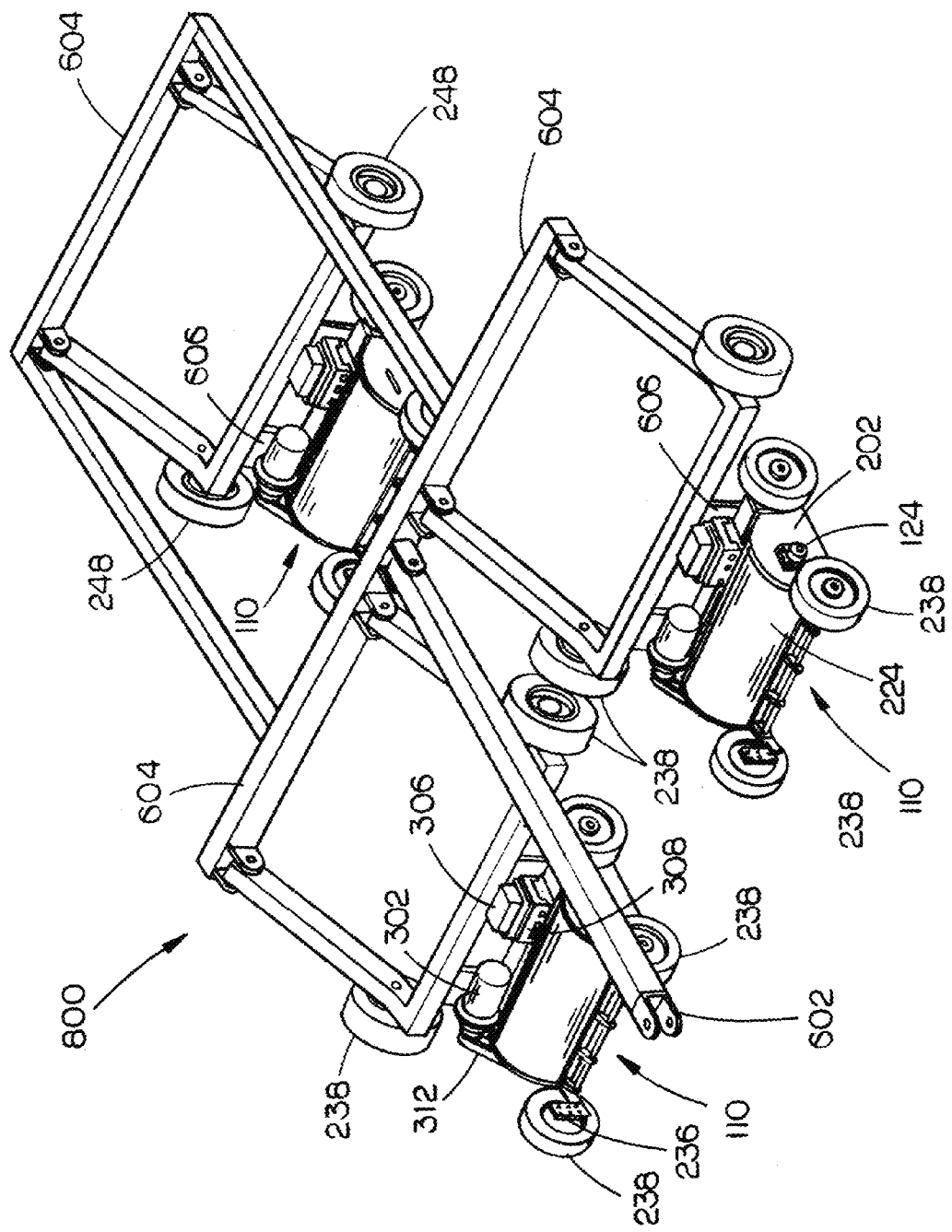
FIG. 10 shows a perspective view of a tow-behind ganged mower deck according to at least one embodiment of the present invention.
Figure 14B:
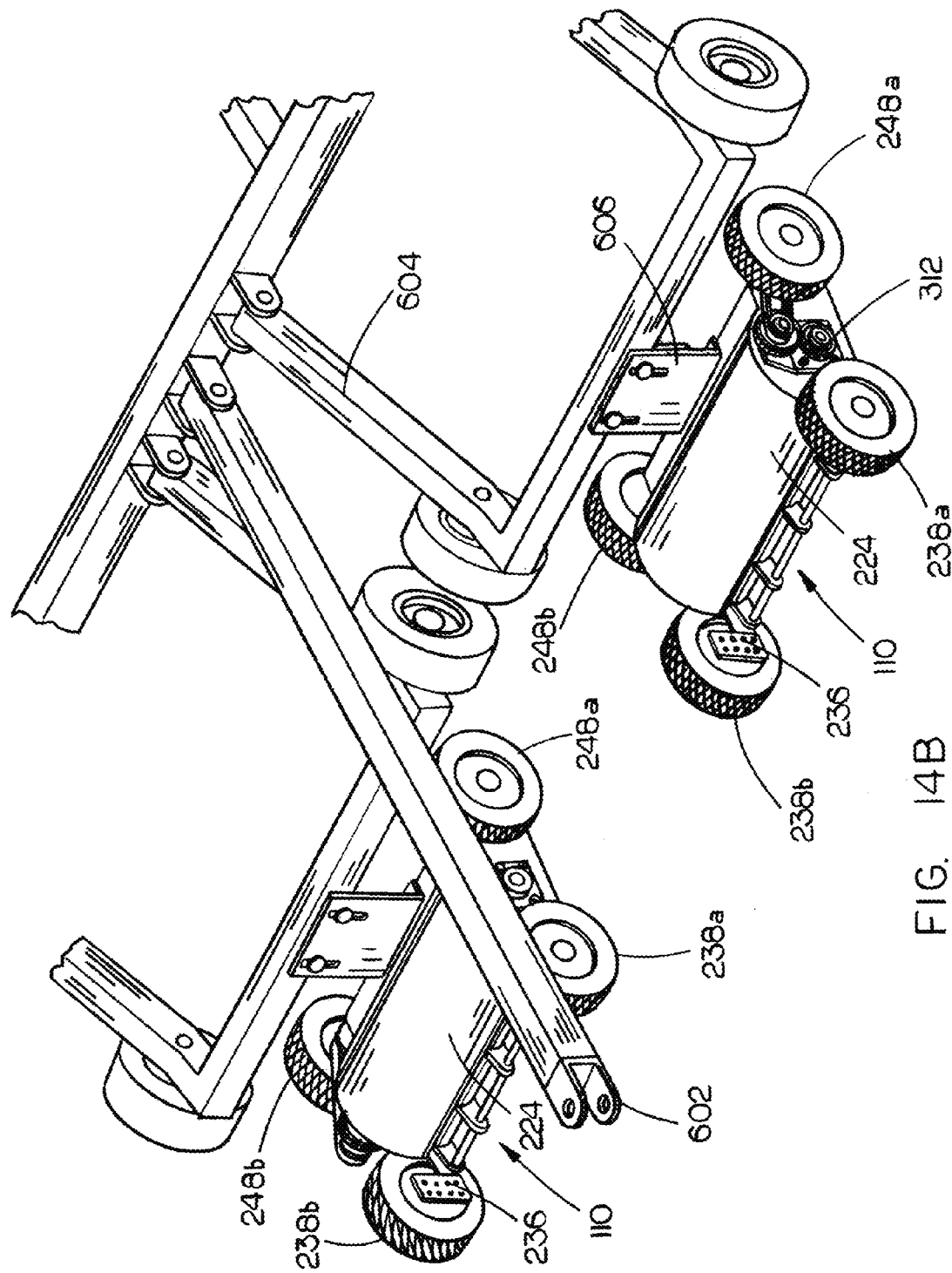
FIG. 14B is an exploded view of a wheel driven tow-behind ganged mower assembly.
Figure 15:
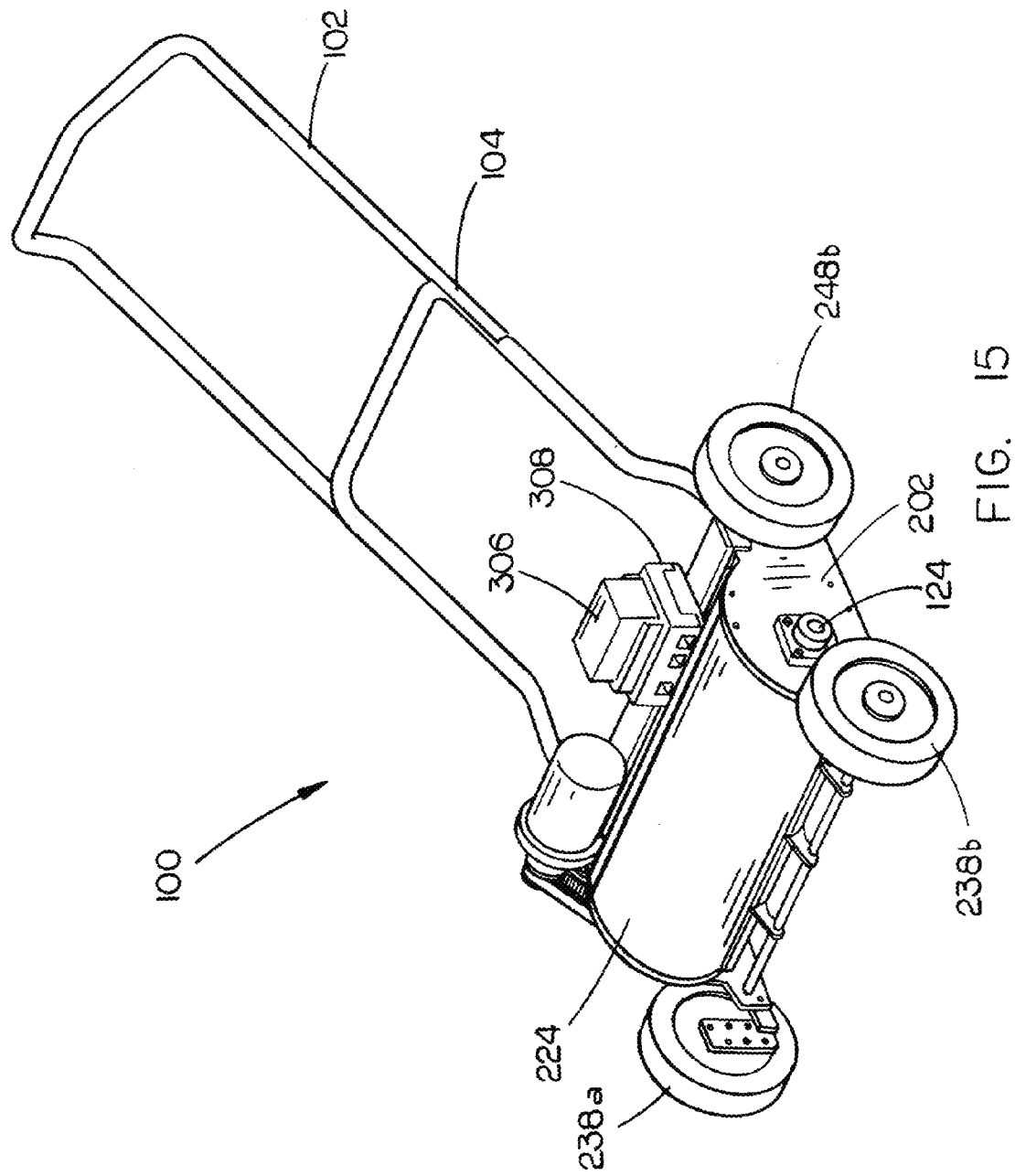
FIG. 15 is a perspective view of the non-drive side of a push type Lawnmower with a blade assembly guard according to at least one embodiment of the present invention.

Referring to FIG. 10, a perspective view of a tow-behind ganged mower deck 800 according to at least one embodiment of the present invention is shown. The tow-behind ganged mower deck 800 may be pulled behind a tractor or like vehicle in one embodiment of the present invention. The tow-behind ganged mower deck 800 may be connected to a tractor or like vehicle by means of a hitch mechanism on the tractor (not shown) and attached by a towing connector 602. The tow-behind ganged mower deck 800 connected through a towing connector 602 may include a power transfer mechanism such as a power take-off. Alternatively, the towing connector 602 may connect a tractor or like vehicle to the tow-behind gang mower deck 800 for towing while one or more horizontal rotary mower blade assemblies 110 are powered through other means such as the motor 302, battery 306 and drive train system 312 as shown in FIG. 10. The tow-behind ganged mower deck deck 800 in one embodiment of the present invention is operatively connected to the tractor or like vehicle (not shown). In one embodiment of the present invention a plurality of horizontal rotary mower blade assemblies 110 are connected to the mower deck framework 604 or connected to one or more undermounted bracket systems 606. In another embodiment (FIG. 14B), the ganged towable mower assembly may be driven from the mower deck wheels or vehicle wheels. Likewise, a gas powered electric generator on a towing vehicle or a large battery may be utilized to power each individual mower deck assembly.

A tow-behind ganged mower deck 800 may include a plurality of horizontal rotary mower blade assemblies 110. The horizontal rotary mower blade assembly 110 may have a motor 302 powered by a battery 306 which is operably connected to a battery charger 308. Alternatively, the horizontal blade assembly could be powered by gasoline or other appropriate means. The motor 302 may engage the horizontal rotary mower blade assembly through some type of drive chain 312 which may include a belt or chain gear assembly. The drive chain 312 is operatively connected to the rotary drive shaft 124 which engages the rotation of a horizontal rotary mower blade assembly 110 here concealed by the front housing 224. The front housing 224 combined with the rear housing 240 define the top piece of the crossflow mower housing according to at least one embodiment of the present invention. The blade assembly (concealed by front housing 224) may also include a drive engaging mechanism 314 (as shown in FIG. 1) to facilitate a connection between the shaft 124 and a drive mechanism; for example, the drive engaging mechanism 314 may be a belt wheel to receive a drive belt connected to a motor.

The horizontal blade assembly 110, in one embodiment of the present invention may include an access panel in the front housing 224 having quick access to allow maintenance and replacement of blades in the blade assembly. A blade assembly useful in this embodiment of the present invention may be as described herein.

In at least one embodiment of the present invention 100 (600, 700, 800) the horizontal rotary mower blade assembly 110, 210 may be removably replaced from the housing 200. For example, a quick axle release 322 may be utilized to allow the rotary drive shaft 124 to be removed from the bearings (206, 208) such that the blade cartridge 210 may be removed from the housing 200 via the front housing 224. Once removed the rotary blade cartridge 210 may be replaced with a fresh blade cartridge 210 having replaced blades (or sharpened blades, or for blade replacement or the like. Additionally, in another configuration of a removable blade cartridge 210 embodiment, one or both of the housing side plates (202, 204) may be quickly and safely removed from the frame 244 (via, for example, quick release fasteners or the like) such that the blade cartridge 210 may be rapidly and safely removed from the housing 200. In this fashion the blade cartridge 210, for example, may be slid from the drive shaft 124 from the rotor axle slot 116 for replacement or the like. In operation a user may also replace individual blades via the front housing 224.

Figure 11B:
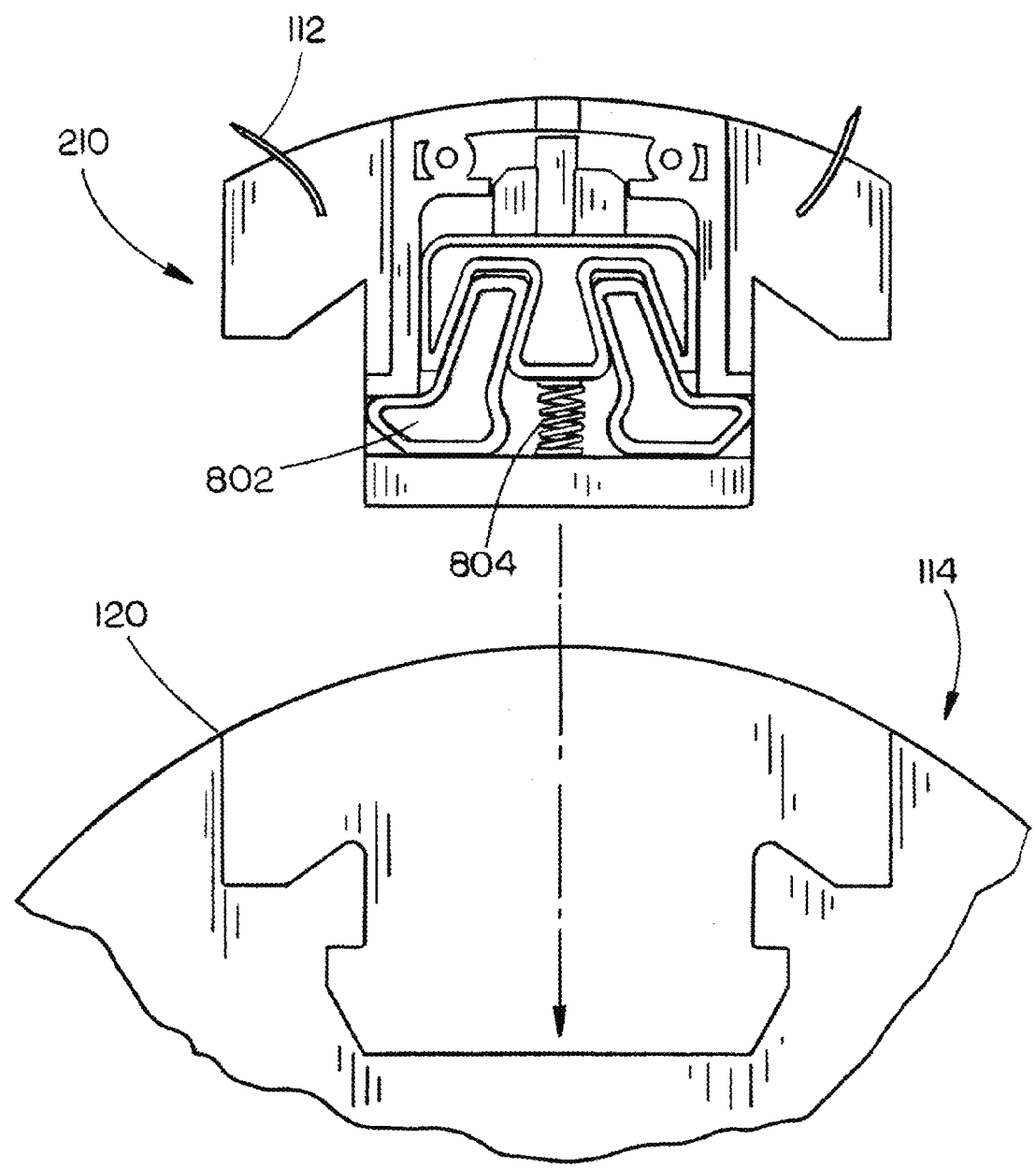
Figure 11C:
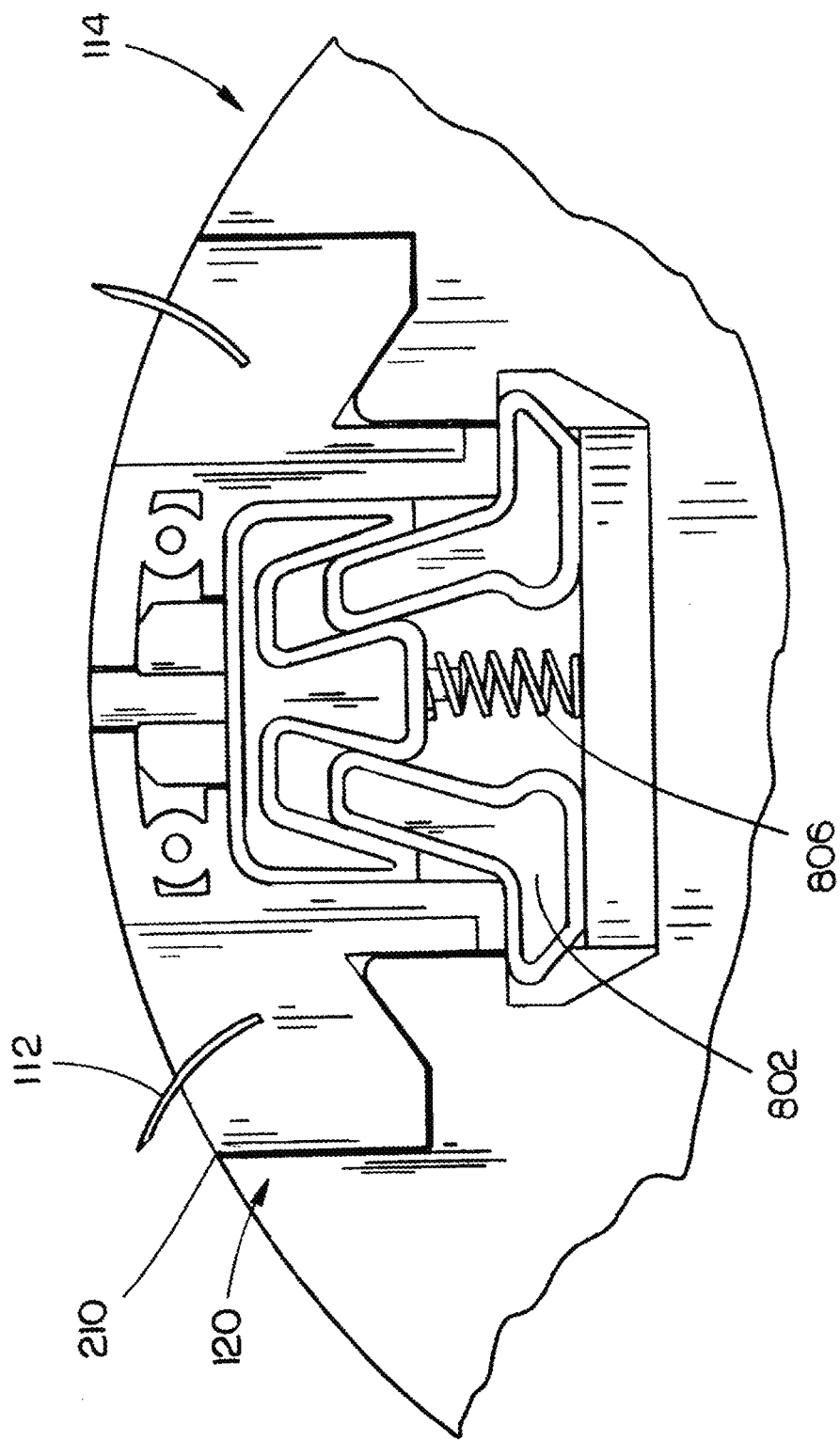

Referring to FIGS. 11A, 11B, and 11C, an exploded view of a radial blade cartridge 210 is shown and an exploded cut out portion of a rotor 114 as shown in FIG. 5. In one embodiment of the present invention the radial blade cartridge may have a spring 804 attached to a locking mechanism 802 whereby the rotary blade cartridge 210 may be placed into the radial rotor blade retention slot 120. The radial rotary blade cartridge 210 may be pushed down into the radial rotor blade retention slot 120 whereby activating the spring loaded locking mechanism 802. In at least one embodiment of the present invention the radial rotary blade cartridge may include a tool designed to push the radial rotary blade cartridge 210 into the radial rotor blade retention slot 120.

Referring to FIG. 12, an exploded view of an axial rotary blade cartridge 810 is shown as placed in an axial rotary blade retention slot 904 and FIG. 13 an exploded cut out view of a rotor 114 and with an exploded view of the blade cartridge 810. The axial rotary blade cartridge 810 may have a length substantially similar to the distance between two rotors of the plurality of rotors 114 as shown in FIG. 5. The rotary blade cartridge 810 may include a blade or a plurality of blades 112. The rotary blade cartridge 810 may have a plurality of bottom brackets 812. The bottom bracket 812 may define a hole substantially similar in diameter to the locking pin 902. The locking pin 902 may be operatively connected to a spring loaded locking mechanism 808. The axial rotary blade cartridge 810 may be connected to the axial rotary blade retention slot 904 as shown in FIG. 13. For example, in one embodiment of the present invention, the horizontal rotary mower blade assembly 110 may be opened at the front housing 224 when the mower is in the off position and the blades 112 may be quickly and easily replaced using the axial rotary blade cartridge 810. The axial rotary blade cartridge 810 may be disposable for example. In another example the blade cartridge may be reused with replacement blades or sharpened blades.

In a presently preferred embodiment, motor operation is restricted to a mowing configuration, for example, all or at least some of the following conditions must be determined to exist by the controller 304: two hands on the push handle 102 dead man switch or the like, no motion detected on or near the mower, housing 200 and assemblies secure and in operational configuration, and mower wheels rotating (238, 248).

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:

1. A horizontal rotary lawn mower, comprising:
 (a) a horizontal rotary blade assembly having a length, a diameter, and a plurality of blades, each of said plurality of blades forming an airfoil and each of said plurality of blades comprising a cutting edge and each of the plurality of blades spanning substantially the entire length of the rotary blade assembly, the horizontal rotary blade assembly comprising a plurality of blade holding elements configured to releasably hold each of the plurality of blades in an orientation such, when the horizontal rotary blade assembly is rotated at an operational speed about an axis parallel to a surface being mowed, the airfoil aspect of the plurality of blades generates an airflow sufficient to direct grass clippings;

(b) a mower housing having a front, a back, a top surface and a bottom surface, said housing substantially surrounding at least a portion of the horizontal rotary blade assembly, said bottom surface defining an opening;

(c) a baffle for dividing said opening into an intake and an exhaust, said intake having a width, said intake width being between 50 and 75 percent of said horizontal rotary blade assembly diameter; and wherein each of the plurality of blade holding elements comprises a retention slot configured to receive a blade cartridge comprising a spring biased locking mechanism.

2. The horizontal rotary lawn mower of claim 1, wherein said exhaust further comprises an opening length and width, said length being at least substantially equal to or less than said horizontal rotary blade assembly length, and said exhaust opening width being between 50 and 70 percent of said horizontal rotary blade assembly diameter.

3. The horizontal rotary lawn mower of claim 2, wherein said horizontal rotary blade assembly defines a cylinder with an axis, a diameter, and a circumference having an arc length of 360 degrees defined by 360 radii, said top most radius being zero, said housing intake opening beginning at between the 225 and 200 degree radii of said horizontal rotary blade assembly and ending at between the 170 and 150 degree radii of said horizontal rotary blade assembly.

4. The horizontal rotary lawn mower of claim 2, wherein said horizontal rotary blade assembly defines a cylinder with an axis, a diameter, and a circumference having an arc length of 360 degrees defined by 360 radii, said top most radius being zero, said housing exhaust opening beginning at between the 60 and 80 degree radii of said horizontal rotary blade assembly and ending at between the 120 and 130 degree radii of said horizontal rotary blade assembly.

5. The horizontal rotary lawn mower of claim 4, wherein said housing intake opening has an arc length of between 60 and 70 degrees, and said exhaust opening has an arc length of between 50 and 60 degrees.

6. The horizontal rotary lawn mower of claim 5, wherein said baffle has at least one dimension approximately equal to the radius of said horizontal rotary blade assembly.

7. The horizontal rotary lawn mower of claim 1, wherein said baffle has a curved surface nearest a rotational arc of said horizontal rotary blade assembly which varies in distance from said rotational arc.

8. The horizontal rotary lawn mower of claim 7, wherein said opening defines a substantially equal annular space between said housing and said horizontal rotary blade assembly by forming a substantially constant radius from approximately 220 to 355 degrees.

9. The horizontal rotary lawn mower of claim 8, wherein said opening distance to said horizontal rotary blade assembly blade arc varies between the arc length defined by the housing bottom surface between approximately 350 and 60 degrees.

10. The horizontal rotary lawn mower of claim 1, wherein each of said plurality of blades has maximum thickness of 0.075 inch and the cutting edge of each of said plurality of blades has a hardness of greater than 50 HRC.

11. The horizontal rotary mower of claim 1, wherein each of the plurality of blade holding elements comprises a retention slot defining a space conforming to the shape of a blade in the plurality of blades.

12. The horizontal rotary mower of claim 1, wherein each of the plurality of blade holding elements comprises retention slot configured to receive a blade cartridge comprising a spring biased locking mechanism.

* * * * *